(12) United States Patent
Lou et al.

(10) Patent No.: US 11,012,125 B2
(45) Date of Patent: May 18, 2021

(54) SIGNAL SENDING AND RECEIVING METHOD TO PAIR USER EQUIPMENT

(71) Applicant: HUAWEI TECHNOLOGIES CO., LTD., Guangdong (CN)

(72) Inventors: Qunfang Lou, Shanghai (CN); Feng Qian, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/453,666

(22) Filed: Jun. 26, 2019

(65) Prior Publication Data

US 2019/0319683 A1 Oct. 17, 2019

Related U.S. Application Data

(63) Continuation of application No. PCT/CN2016/112500, filed on Dec. 28, 2016.

(51) Int. Cl.
*H04B 7/0452* (2017.01)
*H04B 7/06* (2006.01)
(Continued)

(52) U.S. Cl.
CPC ......... *H04B 7/0452* (2013.01); *H04B 7/0617* (2013.01); *H04L 25/0258* (2013.01);
(Continued)

(58) Field of Classification Search
CPC .. H04B 7/0452; H04B 7/0617; H04B 7/0689; H04L 25/0258; H04W 72/044; H04W 72/048
See application file for complete search history.

(56) References Cited

U.S. PATENT DOCUMENTS

| | | | | |
|---|---|---|---|---|
| 2012/0188888 A1* | 7/2012 | Wang | ............ | H04L 5/0025 370/252 |
| 2013/0279457 A1* | 10/2013 | Takano | ............ | H04B 17/318 370/329 |

(Continued)

FOREIGN PATENT DOCUMENTS

| | | |
|---|---|---|
| CN | 102055562 A | 5/2011 |
| CN | 102281124 A | 12/2011 |

(Continued)

OTHER PUBLICATIONS

3GPP TS 36.331 V14.0.0 (Sep. 2016), 3rd Generation Partnership Project; Technical Specification Group Radio Access Network; Evolved Universal Terrestrial Radio Access (E-UTRA); Radio Resource Control (RRC); Protocol specification(Release 14), 643 pages.

(Continued)

*Primary Examiner* — Brian P Cox
(74) *Attorney, Agent, or Firm* — Womble Bond Dickinson (US) LLP

(57) ABSTRACT

Embodiments of the present invention relate to a signal sending method, a signal receiving method, a base station, and user equipment. The method includes: determining, by a base station based on receiver capabilities of user equipments, that first user equipment is to be paired with N second user equipments on a first resource block, where N is a positive integer; and multiplexing, by the base station, a signal of the first user equipment and signals of the N second user equipments onto the first resource block, and sending the signals. It can be learned from the foregoing that according to the embodiments of the present invention, not only channel quality of weak-receiver-capability user equipment is ensured, but also channel quality of strong-receiver-capability user equipment is maintained by using an excel- (Continued)

lent interference suppression capability of the strong-receiver-capability user equipment.

17 Claims, 14 Drawing Sheets

(51) Int. Cl.
*H04L 25/02* (2006.01)
*H04W 72/04* (2009.01)

(52) U.S. Cl.
CPC ....... *H04W 72/044* (2013.01); *H04W 72/048* (2013.01); *H04B 7/0689* (2013.01)

(56) References Cited

U.S. PATENT DOCUMENTS

| | | | |
|---|---|---|---|
| 2013/0286955 A1 | 10/2013 | Morinaga et al. | |
| 2014/0254495 A1 | 9/2014 | Farmanbar et al. | |
| 2014/0273862 A1* | 9/2014 | Maaref | H04W 76/14 455/63.1 |
| 2016/0128025 A1 | 5/2016 | Zhang et al. | |
| 2017/0272134 A1 | 9/2017 | Yuan et al. | |
| 2018/0159643 A1* | 6/2018 | Huang | H04W 52/346 |

FOREIGN PATENT DOCUMENTS

| | | |
|---|---|---|
| CN | 103067056 A | 4/2013 |
| CN | 104243091 A | 12/2014 |
| CN | 104980197 A | 10/2015 |
| CN | 105743824 A | 7/2016 |
| CN | 106209301 A | 12/2016 |
| EP | 3128680 A1 | 2/2017 |
| WO | 2015149477 A1 | 10/2015 |

OTHER PUBLICATIONS

Alcatel-Lucent: Companion feedback in the context of the Rel-10 feedback framework, 3GPP TSG RAN WG1 #60bis Meeting, R1-101861, Beijing, China, Apr. 12-16, 2010. total 10 pages.

* cited by examiner

SIGNAL SENDING AND RECEIVING METHOD TO PAIR USER EQUIPMENT

CROSS-REFERENCE TO RELATED APPLICATIONS

This application is a continuation of International Application No. PCT/CN2016/112500, filed on Dec. 28, 2016, the disclosure of which is hereby incorporated by reference in its entirety.

TECHNICAL FIELD

Embodiments of the present invention relate to the communications field, and in particular, to a signal sending method, a signal receiving method, a base station, and user equipment (UE).

BACKGROUND

A current wireless communication service has a growing demand for a network capacity and communication performance. Potential of conventional manners for improving spectral efficiency such as bandwidth increase, modulation mode optimization, and code division multiplexing is limited. Therefore, in a Long Term Evolution (LTE) technology, a multiple-input multiple-output (MIMO) communications system is proposed, to improve utilization efficiency of bandwidth by using a spatial multiplexing technology. To further increase a cell capacity in a high-load scenario, a multi-user multiple-input multiple-output (MU-MIMO) communications system is further proposed, to multiplex data of a plurality of user equipments onto a same time-frequency resource for sending. The MU-MIMO system usually requires fine design of algorithms in various aspects such as downlink scheduling, user equipment pairing, weight design, modulation and coding scheme (MCS) adjustment, and user equipment interference suppression and cancellation.

In a serving cell, when a plurality of user equipments attempt to send data in a multi-user (MU) pairing mode, for each user equipment, a transmit power is less than that in a single user (SU) transmission mode because of a limitation of a transmit power of a base station. FIG. 1 is a schematic diagram of interference between user equipments in the MU pairing mode. If each user equipment continues using a single-user beamforming (SU-BF) vector weight that is used in the single user transmission mode, severe interference is generated between the user equipments. To avoid interference between paired user equipments, a downlink weight of each user equipment needs to be adjusted after MU pairing. Similarly, a user side also needs to use an appropriate reception weight design based on a receiver capability of the user equipment, to suppress a signal of another paired user equipment in a cell and interference outside the cell.

An existing MU-MIMO solution is usually as follows: A base station side first performs priority calculation based on SU performance of user equipments in a cell, to implement resource scheduling for first layer user equipment, that is, to implement first layer pairing; and attempts to pair second- or higher-layer user equipments at a granularity of a time-frequency resource block group (RBG) or a time-frequency resource block (RB). User equipments for which MU pairing can be successfully implemented have an equal status in an MU weight design process.

It can be learned from the foregoing that, in an existing MU-MIMO technology, all paired user equipments have the equal status in the MU weight design process; and as the user equipment is continuously updated, a quantity of receive antennas of the user equipment gradually increases, and a larger quantity of the receive antennas indicates a stronger interference suppression capability of a user equipment receiver. A serving cell has various types of user equipments with different receiver capabilities. When MU pairing is performed for user equipments with different receiver capabilities (that is, in a hybrid user MU pairing scenario), if the MU weight design solution in which user equipments have an equal status is still used, signal quality of weak-receiver-capability user equipment degrades, and an interference suppression capability of strong-receiver-capability user equipment is wasted.

SUMMARY

Embodiments of the present invention provide a signal sending method, a signal receiving method, a base station, and user equipment, to ensure channel quality of weak-receiver-capability user equipment, and maintain channel quality of strong-receiver-capability user equipment by using an excellent interference suppression capability of the strong-receiver-capability user equipment.

According to a first aspect, an embodiment of the present invention provides a signal sending method, including: determining, by a base station based on receiver capabilities of user equipments, that first user equipment is to be paired with N second user equipments on a first resource block, where N is a positive integer; and multiplexing, by the base station, a signal of the first user equipment and signals of the N second user equipments onto the first resource block, and sending the signals.

In this embodiment of the present invention, in a hybrid user pairing scenario, the base station determines pairing of the plurality of user equipments based on the receiver capabilities of the user equipments. This not only ensures channel quality of a weak-receiver-capability user, but also maintains channel quality of a strong-receiver-capability user by using an excellent interference suppression capability of the strong-receiver-capability user.

In one embodiment, the base station determines an MU weight of the first user equipment and MU weights of the N second user equipments based on a receiver capability of the first user equipment and receiver capabilities of the second user equipments; and the base station determines, based on the MU weight of the first user equipment and the MU weights of the N second user equipments, that the first user equipment is to be paired with the N second user equipments. According to this implementation, an MU weight design solution based on unidirectional zero forcing is designed for the hybrid user pairing scenario based on a receiver type, to ensure the channel quality of the weak-receiver-capability user, and maintain the channel quality of the strong-receiver-capability user by using the excellent interference suppression capability of the strong-receiver-capability user.

In one embodiment, the first user equipment and the N second user equipments are sorted in ascending order of the receiver capabilities, where $1^{st}$ user equipment to $M^{th}$ user equipment are high-level user equipments, and $(M+1)^{th}$ user equipment to $(N+1)^{th}$ user equipment are low-level user equipments; MU weights of the high-level user equipments are obtained by performing mutual zero forcing between the M high-level user equipments; and MU weights of the low-level user equipments are obtained by performing mutual zero forcing between the first user equipment and the N second user equipments. According to this implementation, the user equipments are divided into the high-level user equipments and the low-level user equipments based on the receiver capability, so that depending on whether user equipment is high-level user equipment or low-level user equipment, a corresponding method can be used to determine an MU weight of the user equipment.

In one embodiment, the MU weights of the low-level user equipments are obtained by performing mutual zero forcing between the first user equipment and the N second user equipments by using an MU weight calculation method, and the MU weight calculation method is determined based on service types of the low-level user equipments. According to this implementation, in an MU weight design process, an appropriate weight algorithm is used based on service types of paired users to maintain performance of a small packet service.

In one embodiment, the base station determines an MCS of the first user equipment and MCSs of the N second user equipments based on the MU weight of the first user equipment and the MU weights of the N second user equipments; and the base station determines, based on the MCS of the first user equipment and the MCSs of the N second user equipments, that the first user equipment is to be paired with the N second user equipments. According to this implementation, the MU weights determined based on the receiver capabilities of the user equipments are used to determine the MCSs of a plurality of pre-paired user equipments, and therefore to determine that the plurality of user equipments can be paired with each other.

In one embodiment, the first user equipment and the N second user equipments are sorted in ascending order of the receiver capabilities, where the $1^{st}$ user equipment to the $M^{th}$ user equipment are the high-level user equipments, and the $(M+1)^{th}$ user equipment to the $(N+1)^{th}$ user equipment are the low-level user equipments; and for each low-level user equipment: the base station determines whether the low-level user equipment is capable of eliminating an interference signal of another user equipment from a received signal; and the base station determines an MCS of the low-level user equipment based on a determining result, the MU weight of the first user equipment, and the MU weights of the N second user equipments. According to this implementation, when determining that the low-level user equipment is capable of eliminating the interference signal of the another user equipment from the received signal, the base station can further enhance the MCS.

In one embodiment, before the base station multiplexes the signal of the first user equipment and the signals of the N second user equipments onto the first resource block and sends the signals, the base station sends a message to the first user equipment or at least one second user equipment, where the message includes cancellation information of another user equipment, and the cancellation information includes at least an MCS. According to this implementation, the base station sends the cancellation information to the user equipment, so that the user equipment can demodulate and decode interference from the another paired user equipment. A solution is designed to eliminate such interference from a received signal, releasing an interference suppression capability of a receiver of the user equipment.

According to a second aspect, an embodiment of the present invention provides a signal sending method, including: sending, by a base station, a message to first user equipment, where the message includes cancellation information of second user equipment, and the cancellation information includes an MCS; and sending, by the base station, a signal to the first user equipment over a first resource block, where the first user equipment and the second user equipment are paired user equipments on the first resource block.

In this embodiment of the present invention, the base station sends the cancellation information to the user equipment, so that the user equipment can demodulate and decode interference from another paired user equipment. A solution is designed to eliminate such interference from a received signal, releasing an interference suppression capability of a receiver of the user equipment.

In one embodiment, the cancellation information further includes an MU weight.

In one embodiment, a receiver capability of the first user equipment is stronger than that of the second user equipment.

According to a third aspect, a signal receiving method is provided, including: receiving, by first user equipment, a message from a base station, where the message includes cancellation information of second user equipment, and the cancellation information includes an MCS; receiving, by the first user equipment, a first signal from the base station over a first resource block, where the first user equipment and the second user equipment are paired user equipments on the first resource block; performing, by the first user equipment, interference cancellation on the first signal based on the MCS of the second user equipment, to obtain a second signal; and decoding, by the first user equipment, the second signal.

In this embodiment of the present invention, the user equipment receives the cancellation information from the base station, so that the user equipment can demodulate and decode interference from another paired user equipment. A solution is designed to eliminate such interference from the received signal, releasing an interference suppression capability of a receiver of the user equipment.

In one embodiment, the cancellation information further includes an MU weight; and the first user equipment performs interference cancellation on the first signal based on the MCS and the MU weight of the second user equipment, to obtain the second signal.

In one embodiment, a receiver capability of the first user equipment is stronger than that of the second user equipment.

According to still another aspect, an embodiment of the present invention provides a base station. The base station can implement functions implemented by the base station in the foregoing method embodiments, and the functions may be implemented by hardware, or may be implemented by hardware executing corresponding software. The hardware or the software includes one or more modules corresponding to the functions.

In one embodiment, a structure of the base station includes a processor and a communications interface. The processor is configured to support the base station in executing the corresponding functions in the foregoing methods, and the communications interface is configured to support communication between the base station and user equipment or another network element. The base station may further include a memory. The memory is configured to be coupled to the processor, and stores a program instruction and data that are necessary for the base station.

According to still another aspect, an embodiment of the present invention provides user equipment. The user equipment can implement functions implemented by the user equipment in the foregoing method embodiments, and the functions may be implemented by hardware, or may be implemented by hardware executing corresponding software. The hardware or the software includes one or more modules corresponding to the functions.

In one embodiment, a structure of the user equipment includes a processor and a communications interface. The processor is configured to support the user equipment in executing the corresponding functions in the foregoing methods, and the communications interface is configured to support communication between the user equipment and a base station or another network element. The user equipment may further include a memory. The memory is configured to be coupled to the processor, and stores a program instruction and data that are necessary for the user equipment.

According to still another aspect, an embodiment of the present invention provides a communications system. The system includes the base station and the user equipment according to the foregoing aspects.

According to yet another aspect, an embodiment of the present invention provides a computer storage medium, configured to store a computer software instruction used by the foregoing base station. The computer software instruction includes a program designed for executing the first aspect or the second aspect.

According to yet another aspect, an embodiment of the present invention provides a computer storage medium, configured to store a computer software instruction used by the foregoing user equipment. The computer software instruction includes a program designed for executing the third aspect.

Compared with the prior art, in the solutions provided in the embodiments of the present invention, the MU weight design solution based on unidirectional zero forcing is designed for the hybrid user pairing scenario based on the receiver type, to ensure the channel quality of the weak-receiver-capability user, and maintain the channel quality of the strong-receiver-capability user by using the excellent interference suppression capability of the strong-receiver-capability user.

DESCRIPTION OF EMBODIMENTS

To make the purpose, technical solutions, and advantages of the embodiments of the present invention clearer, the following describes the technical solutions of the embodiments of the present invention with reference to the accompanying drawings in the embodiments of the present invention.

The embodiments of the present invention provide a signal sending method. The method may be applied to an LTE communications system, for example, a frequency division duplex (FDD) architecture system or a time division duplex (TDD) architecture system in the LTE communications system. In a main application scenario, there are users with various receiver capabilities in a multi-antenna cell.

Figure 1:
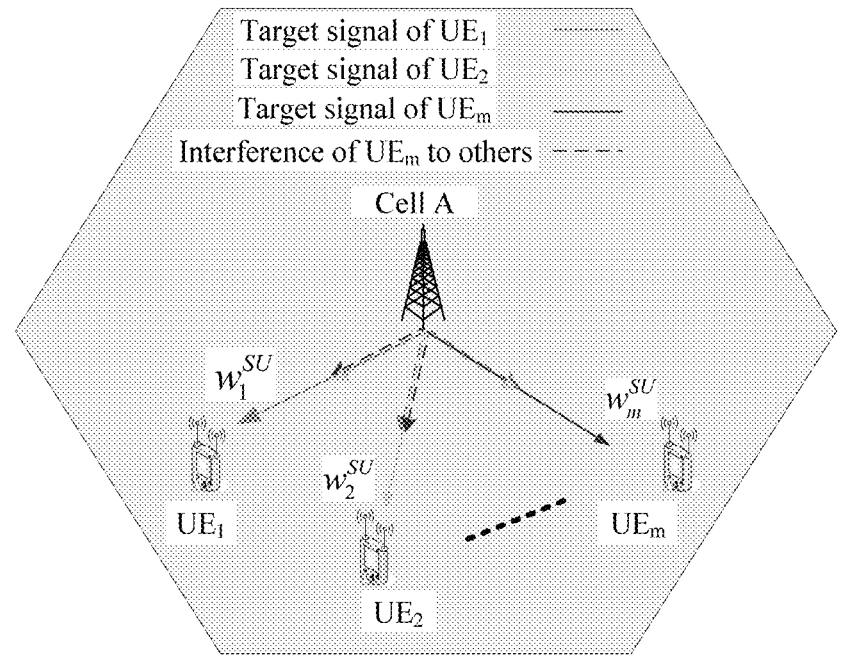
FIG. 1 is a schematic diagram of interference between user equipments in an MU pairing mode.
Figure 2:
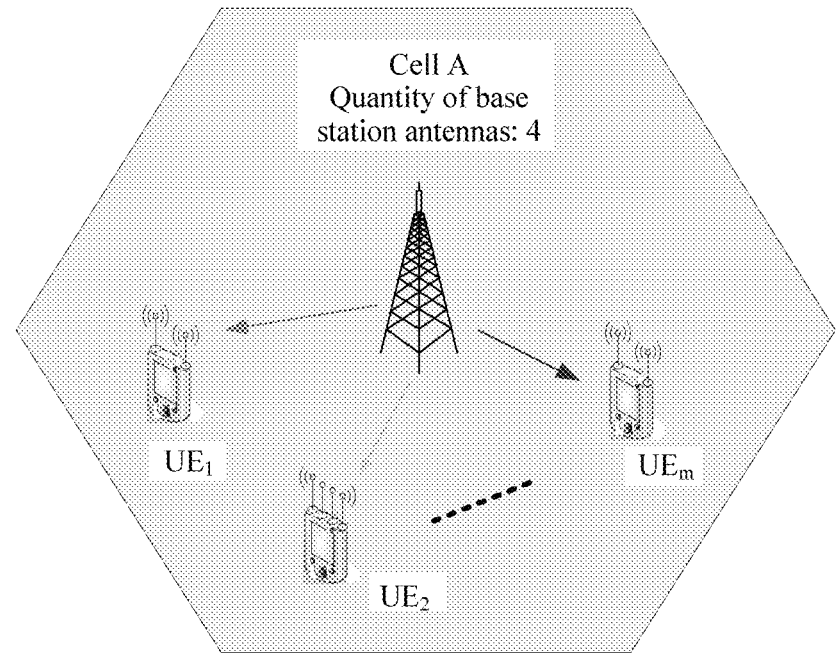
FIG. 2 is a schematic diagram of an application scenario on which an embodiment of the present invention is based.

FIG. 2 is a schematic diagram of an application scenario on which the embodiments of the present invention are based. A base station has four antennas, and can implement MIMO downlink transmission through BF weight design. There are user equipment (UE) with two receive antennas and UE with four receive antennas in a cell. The foregoing application scenario is merely an example. In practice, the method may be applied to a scenario in which there is a base station with more antennas and more types of user equipments.

The signal sending method provided in the embodiments of the present invention mainly relates to a Media Access Control (MAC) layer and a physical layer on a base station side. A scheduling control algorithm is implemented at the MAC layer of the base station side, and an MU weight design algorithm, MCS adjustment, and the like are implemented at the physical layer of the base station side.

A signal receiving method provided in the embodiments of the present invention mainly relates to a physical layer on a user side. Interference demodulation and decoding, interference cancellation, reception weight design, and the like are all implemented at the physical layer of UE.

Figure 3A:
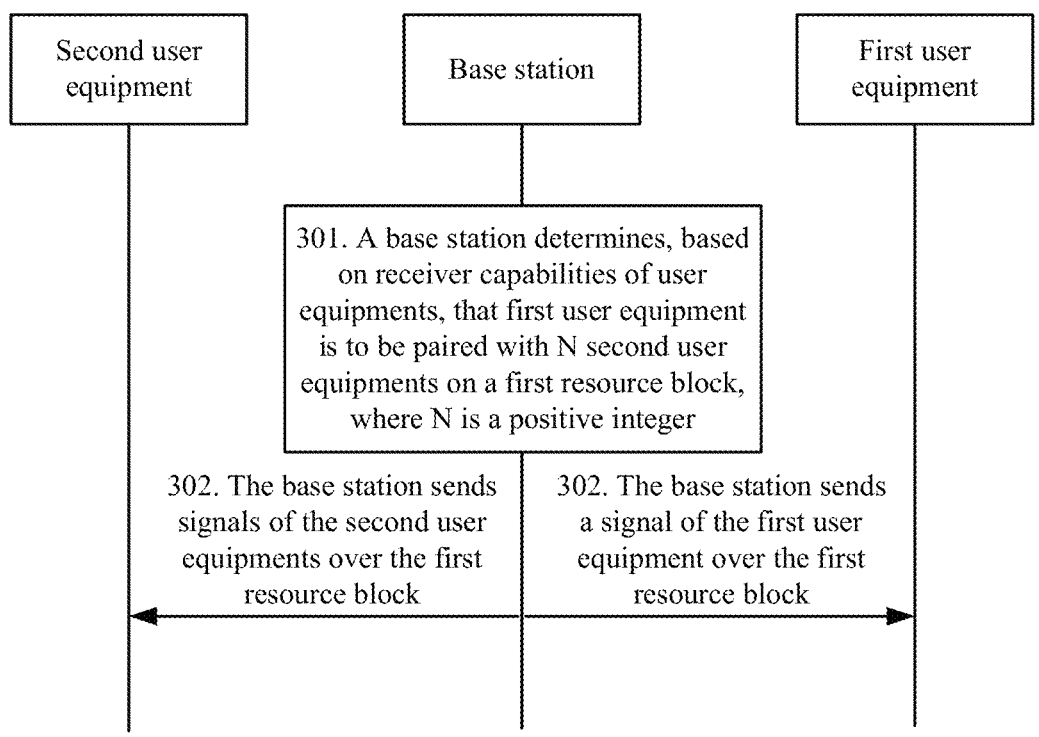
FIG. 3A is a schematic communication diagram of a signal sending method according to an embodiment of the present invention.

FIG. 3A is a schematic communication diagram of a signal sending method according to an embodiment of the present invention. The method may be based on the application scenario shown in FIG. 2, and the method includes the following operations.

Operation 301: A base station determines, based on receiver capabilities of user equipments, that first user equipment is to be paired with N second user equipments on a first resource block, where N is a positive integer.

In an example, the base station determines an MU weight of the first user equipment and MU weights of the N second user equipments based on a receiver capability of the first user equipment and receiver capabilities of the second user equipments; and the base station determines, based on the MU weight of the first user equipment and the MU weights of the N second user equipments, that the first user equipment is to be paired with the N second user equipments.

Based on the foregoing example, in another example, the base station sorts the first user equipment and the N second user equipments in ascending order of the receiver capabilities, where $1^{st}$ user equipment to $M^{th}$ user equipment are high-level user equipments, and $(M+1)^{th}$ user equipment to $(N+1)^{th}$ user equipment are low-level user equipments; obtains MU weights of the high-level user equipments by performing mutual zero forcing between the M high-level user equipments; and obtains MU weights of the low-level user equipments by performing mutual zero forcing between the first user equipment and the N second user equipments.

Based on the foregoing example, in still another example, the MU weights of the low-level user equipments are obtained by performing mutual zero forcing between the first user equipment and the N second user equipments by using an MU weight calculation method, and the MU weight calculation method is determined based on service types of the low-level user equipments.

Based on the foregoing example, in still another example, the base station determines an MCS of the first user equipment and MCSs of the N second user equipments based on the MU weight of the first user equipment and the MU weights of the N second user equipments; and the base station determines, based on the MCS of the first user equipment and the MCSs of the N second user equipments, that the first user equipment is to be paired with the N second user equipments.

Based on the foregoing example, in still another example, the base station sorts the first user equipment and the N second user equipments in ascending order of the receiver capabilities, where the $1^{st}$ user equipment to the $M^{th}$ user equipment are the high-level user equipments, and the $(M+1)^{th}$ user equipment to the $(N+1)^{th}$ user equipment are the low-level user equipments; and for each low-level user equipment: the base station determines whether the low-level user equipment is capable of eliminating an interference signal of another user equipment from a received signal; and the base station determines an MCS of the low-level user equipment based on a determining result, the MU weight of the first user equipment, and the MU weights of the N second user equipments. For example, an SINR is first calculated based on the MU weights, and then the corresponding MCS is determined based on the SINR. If the determining result is that the interference signal can be eliminated, a denominator for calculating the SINR does not include the interference signal, and the calculated SINR is corresponding to a high-level MCS. If the determining result is that the interference signal cannot be eliminated, a denominator for calculating the SINR includes the interference signal, and the calculated SINR is corresponding to a low-level MCS.

Operation 302: The base station multiplexes a signal of the first user equipment and signals of the N second user equipments onto the first resource block, and sends the signals.

In an example, the base station sends a message to the first user equipment or at least one second user equipment. The message includes cancellation information of another user equipment, and the cancellation information includes at least an MCS. The cancellation information is used by the user equipment to: before performing decoding, perform interference cancellation on an interference signal generated by the another paired user equipment.

The MCS includes a modulation scheme and coding information. Herein, the modulation scheme may be QPSK, 16QAM, 64QAM, or the like, or may be an order of the modulation scheme, for example, second-order, fourth-order, or sixth-order. The coding information may be information about a transport block size, for example, may be a transport block index indicating the transport block size. It should be noted that the description herein is merely an example and the present invention is not limited thereto. An MCS index is usually used to indicate a combination of the modulation scheme and the coding information. For example, an MCS index 1 is corresponding to a combination of second-order modulation and a transport block size index 1. For another example, an MCS index 3 is corresponding to second-order modulation and a transport block size index 3. For still another example, an MCS index 10 is corresponding to a combination of fourth-order modulation and a transport block size index 9. It should be noted that the description herein is merely an example and the present invention is not limited thereto.

In this embodiment of the present invention, in a hybrid user pairing scenario, the base station determines pairing of the plurality of user equipments based on the receiver capabilities of the user equipments. This not only ensures channel quality of a weak-receiver-capability user, but also maintains channel quality of a strong-receiver-capability user by using an excellent interference suppression capability of the strong-receiver-capability user.

Figure 3B:
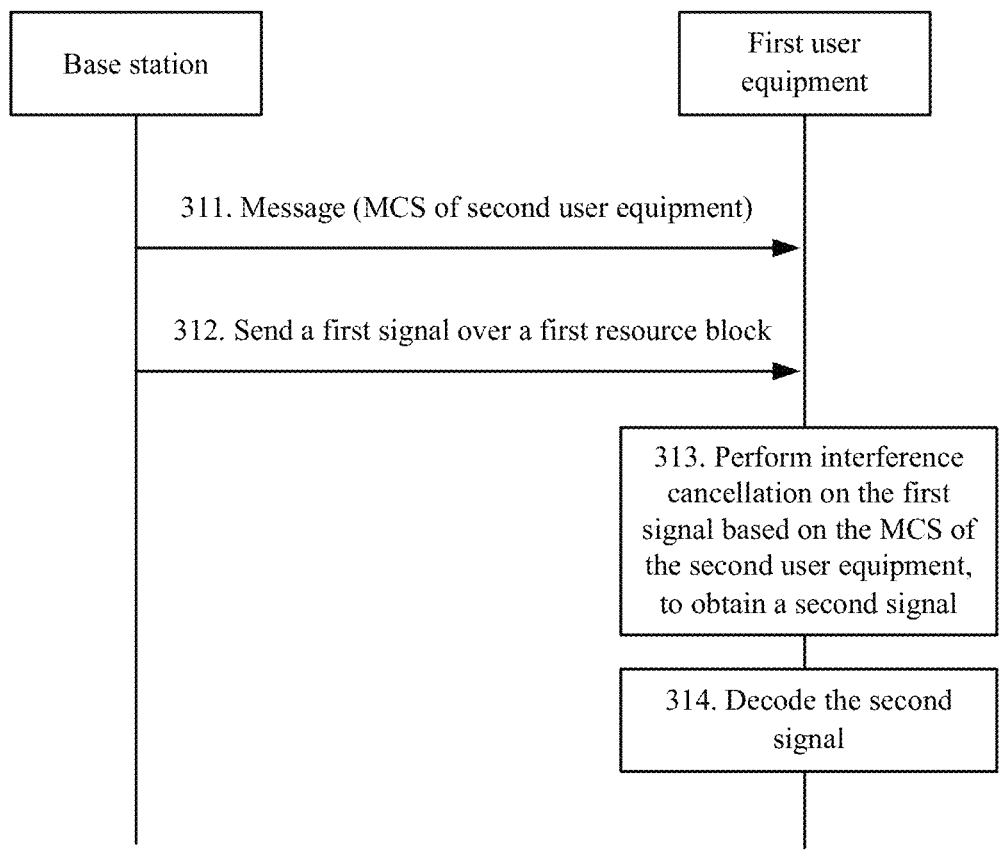
FIG. 3B is a schematic communication diagram of another signal sending and receiving method according to an embodiment of the present invention.

FIG. 3B is a schematic communication diagram of another signal sending and receiving method according to an embodiment of the present invention. The method may be based on the application scenario shown in FIG. 2, and the method includes the following operations.

Operation 311: A base station sends a message to first user equipment, where the message includes cancellation information of second user equipment, and the cancellation information includes an MCS.

For the MCS, refer to the description in the foregoing embodiment.

The cancellation information may include a modulation scheme and coding information, or may include an MCS index corresponding to a modulation scheme and coding information. A receiving end may determine a bit rate of a signal based on the MCS and an SINR, and demodulate and decode the received signal. A larger value of the MCS index indicates a higher MCS level and a higher rate.

In an example, the cancellation information further includes an MU weight.

Operation 312: The base station sends a first signal to the first user equipment over a first resource block.

The first user equipment and the second user equipment are paired user equipments on the first resource block.

In an example, a receiver capability of the first user equipment is stronger than that of the second user equipment.

Operation 313: The first user equipment performs interference cancellation on the first signal based on the MCS of the second user equipment, to obtain a second signal.

The first user equipment receives the message from the base station, where the message includes the cancellation information of the second user equipment, and the cancellation information includes the MCS; and the first user equipment receives the first signal from the base station over the first resource block, where the first user equipment and the second user equipment are paired user equipments on the first resource block.

In an example, the cancellation information further includes the MU weight; and the first user equipment performs interference cancellation on the first signal based on the MCS and the MU weight of the second user equipment, to obtain the second signal.

In an example, the receiver capability of the first user equipment is stronger than that of the second user equipment. That is, among a plurality of paired user equipments, only strong-receiver-capability user equipment performs interference cancellation on an interference signal generated by another paired user equipment.

Operation 314: The first user equipment decodes the second signal.

In this embodiment of the present invention, the base station sends the cancellation information to the user equipment, so that the user equipment can demodulate and decode interference from another paired user equipment. A solution is designed to eliminate such interference from the received signal, releasing an interference suppression capability of a receiver of the user equipment.

Figure 3C:
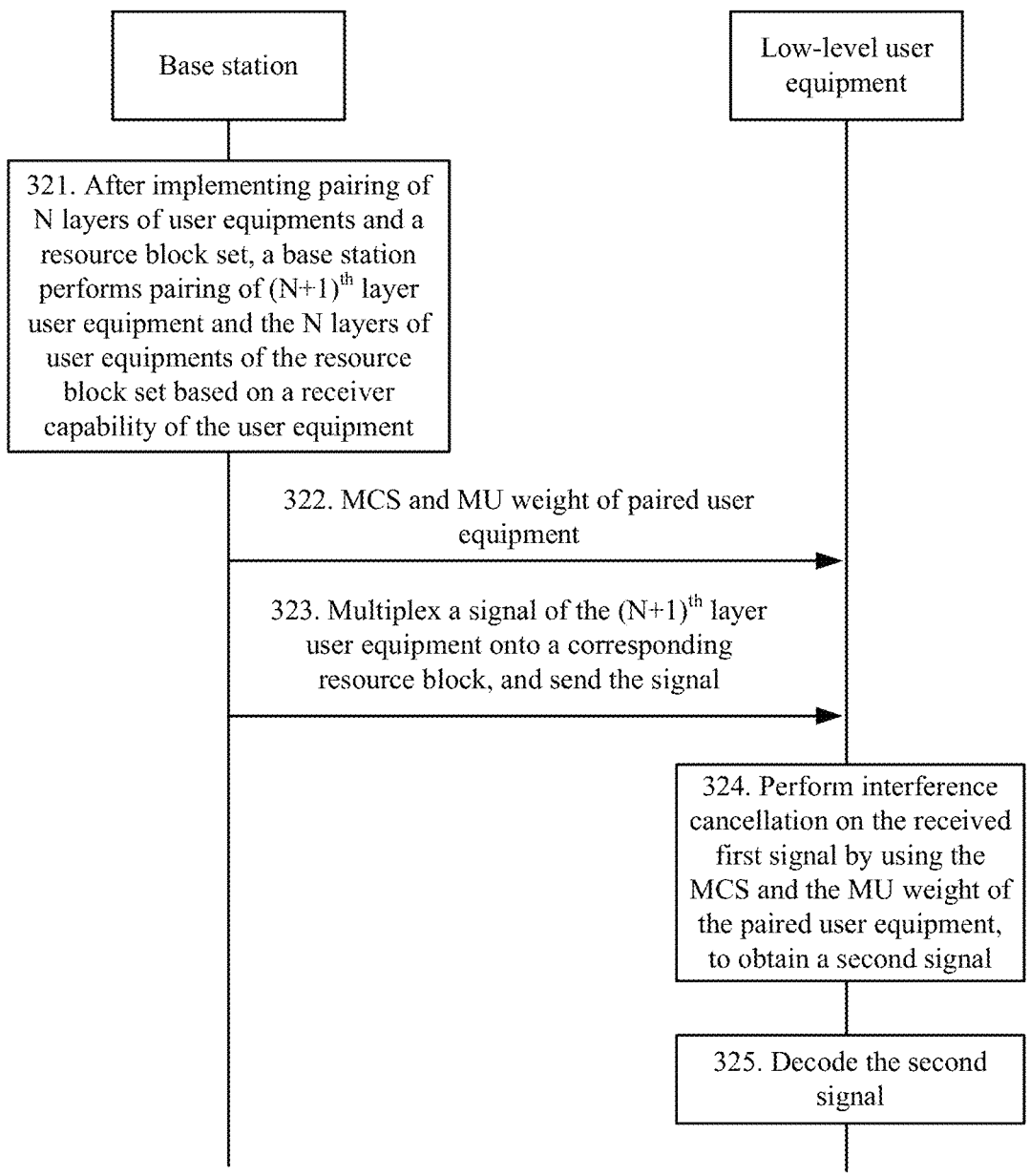
FIG. 3C is a schematic communication diagram of still another signal sending and receiving method according to an embodiment of the present invention.

FIG. 3C is a schematic communication diagram of still another signal sending and receiving method according to an embodiment of the present invention. The method may be based on the application scenario shown in FIG. 2, and the method includes the following operations.

Operation 321: After implementing pairing of N layers of user equipments and a resource block set, a base station performs pairing of $(N+1)^{th}$ layer user equipment and the N layers of user equipments of the resource block set based on a receiver capability of the user equipment.

User equipment layering is to pair, layer by layer, user equipment with user equipments to which a resource block has been allocated. For example, one resource block is allocated to $1^{st}$ user equipment, and the $1^{st}$ user equipment is used as a first layer user. To allocate the resource block to a $2^{nd}$ user, the $2^{nd}$ user needs to be paired with the first layer user. If the pairing is successful, the $2^{nd}$ user is a second layer user of the resource block. By analogy, when the resource block has been used by N user equipments, allocation of the resource block to another user equipment is referred to as $(N+1)^{th}$ layer pairing, and an $(N+1)^{th}$ user needs to be paired with the N user equipments on the resource block.

User equipment levels are classified into high and low by receiver capability of user equipment, that is, user equipment levels include a high level and a low level, and user equipments include high-level user equipment and low-level user equipment, where a receiver capability of the high-level user equipment is weaker than a receiver capability of the low-level user equipment. For example, a threshold may be set, and user equipment whose receiver capability is higher than the threshold is high-level user equipment, and user equipment whose receiver capability is lower than the threshold is low-level user equipment. Alternatively, N+1 user equipments are sorted in ascending order of the receiver capabilities, and first M user equipments are high-level user equipments, and last N+1−M user equipments are low-level user equipments. It should be noted that the foregoing is merely an example and the present invention is not limited thereto.

In an example, operations 321a and 321b are performed for each resource block in the resource block set and each candidate user equipment of the $(N+1)^{th}$ layer user equipment.

Operation 321a. Determine an MU weight of the candidate user equipment and an MU weight of each user equipment in the N layers of user equipments based on user equipment levels of the candidate user equipment of the $(N+1)^{th}$ layer user equipment and each user equipment in the N layers of user equipments.

In an example, if a user equipment level of the candidate user equipment of the $(N+1)^{th}$ layer user equipment is different from that of at least one user equipment in the N layers of user equipments, the scenario is a hybrid pairing scenario. The candidate user equipment and the N layers of user equipments form N+1 pre-paired user equipments. Mutual zero forcing is performed between high-level user equipments in the N+1 pre-paired user equipments to obtain MU weights of the high-level user equipments, and mutual zero forcing is performed between the N+1 pre-paired user equipments to obtain MU weights of low-level user equipments.

It can be understood that, when $(N+1)^{th}$ layer pairing is performed, the resource block has been paired with the N layers of user equipments, and therefore pairing of the candidate user equipment and the resource block may be considered as pairing of the candidate user equipment, the resource block, and the paired user equipments on the resource block. In addition, whether the candidate user equipment can be paired with the resource block depends on the N user equipments that have been paired with the resource block. If the candidate user equipment cannot cooperate well with the paired user equipments, the candidate user equipment cannot be paired with the resource block.

The foregoing zero forcing is an MU weight design method, intended to design an MU weight that can make transmission channels of one paired user equipment and another paired user equipment orthogonal to each other as much as possible, to implement an ideal solution of zero interference between the user equipments.

In an example, an MU weight algorithm is determined based on a service type of each low-level user equipment in the N+1 pre-paired user equipments, and mutual zero forcing is performed between the N+1 pre-paired user equipments by using the MU weight algorithm, to obtain the MU weights of the low-level user equipments.

When a zero-forcing idea is used to design an MU weight for low-level user equipment, a corresponding weight algorithm is used based on a service type, so that performance of a small packet service is maintained. When low-level user equipment that carries the small packet service exists in the N+1 user equipments, an REZF or SLNR algorithm is used, so that a degree of linear zero forcing is controlled to maintain a target signal strength of the low-level user equipment. When all the low-level user equipments carry a large packet service, a more aggressive EZF algorithm is used to seek a better zero-forcing effect and reduce interference to the high-level user equipments.

Operation 321b: Pair the $(N+1)^{th}$ layer user equipment with the resource block based on the MU weight of the candidate user equipment and the MU weight of each user equipment in the N layers of user equipments paired with the candidate user equipment.

In an example, the candidate user equipment and the N layers of user equipments form N+1 pre-paired user equipments. An MCS of each pre-paired user equipment is determined based on an MU weight of each of the N+1 pre-paired user equipments, and the $(N+1)^{th}$ layer user equipment is paired with the resource block based on the MCS of each pre-paired user equipment.

In an example, it is determined, based on the MU weight of each of the N+1 pre-paired user equipments, whether low-level user equipment has a capability of correctly decoding interference, that is, it is determined whether the low-level user equipment can detect an interference signal generated by another pre-paired user equipment. When it is determined that the low-level user equipment has the capability of correctly decoding interference, it indicates that the low-level user can correspondingly eliminate the decoded interference signal, and an MCS of each low-level user is determined based on the MU weight of each pre-paired user equipment and an estimated value obtained after the interference signal is eliminated. When it is determined that the low-level user equipment does not have the capability of correctly decoding interference, an MCS of each low-level user equipment is determined based on the MU weight of each pre-paired user equipment. This has been described in the foregoing embodiment, and details are not repeated herein.

In an example, the following method may be used to determine whether the low-level user equipment has the capability of correctly decoding interference: For example, during processing for one low-level user equipment, a strength of an interference signal that is expected to be sent to high-level user equipment but is leaked to the low-level user equipment is calculated based on an obtained MU weight; the interference is used as a signal, all other signals received by the low-level user equipment are used as noise, and an SINR1 can be obtained through calculation; and a corresponding MCS1 is obtained through table lookup based on the SINR1. Then, an SINR2 obtained when the high-level user equipment signal is received at the high-level user equipment is calculated, and a corresponding MCS2 is obtained through table lookup based on the SINR2. If the SINR1 is close to the SINR2 or the SINR1 is greater than the SINR2, it is considered that the low-level user equipment has the capability of correctly decoding interference.

In an example, the following method may be used to determine an MCS of each low-level user equipment on a premise that interference can be correctly canceled: It is assumed that user equipment 1 is determined to be able to decode interference from user equipment 4, the user equipment 1 and user equipment 2 are low-level user equipments, and user equipment 3 and the user equipment 4 are high-level user equipments. When no interference can be decoded, an SINR of the low-level user equipment 1 is S1/(I2+I3+I4+N). When it is determined that interference from the user equipment 4 can be decoded, an SINR of the low-level user equipment 1 is S1/(I2+I3+N). The latter SINR value is obviously larger, and therefore a corresponding MCS modulation mode can be more aggressive, that is, an MCS value is larger, and correspondingly, in a physical sense, an information sending rate can be higher.

Operation 322: The base station sends, to low-level user equipment, an MCS and an MU weight of another user equipment paired with the low-level user equipment.

The another user equipment may in one embodiment include high-level user equipment or low-level user equipment.

Operation 323: The base station multiplexes a signal of the $(N+1)^{th}$ layer user equipment onto a corresponding resource block based on a pairing result of the $(N+1)^{th}$ layer user equipment and the resource block set, and sends the signal.

Operation 324: The low-level user equipment performs interference cancellation on the received first signal by using the MCS and the MU weight of the another user equipment, to obtain a second signal.

An interference cancellation process may in one embodiment include the following: All other information different from interference is used as noise, and the interference is first demodulated and decoded. Then, an interference signal obtained through previous decoding is subtracted from the received signal, and interference cancellation is completed.

Operation 325: The low-level user equipment decodes the second signal.

In this embodiment of the present invention, operations 322, 324, and 325 are optional operations, and a solution may include only operation 321 and operation 323.

Compared with the prior art, in the solution provided in this embodiment of the present invention, an MU weight design solution based on unidirectional zero forcing is designed for the hybrid user equipment pairing scenario based on a receiver type, to ensure channel quality of weak-receiver-capability user equipment, and maintain channel quality of strong-receiver-capability user equipment by using an excellent interference suppression capability of the strong-receiver-capability user equipment.

Downlink control signaling is used to help implement demodulation, decoding, and cancellation on MU interference on a low-level user equipment side, and improve an interference suppression effect of the low-level user equipment. Information, such as a precoding matrix indicator (Precoding Matrix Indicator, PMI) and an MCS, about interference from paired user equipment is notified to the low-level user equipment to implement interference cancellation. If interference can be canceled, a conventional reception weight design is not used to avoid the interference from the paired user equipment. The low-level user equipment can have more interference suppression dimensions to suppress more other out-of-cell interference. Because unidirectional zero forcing is used, an effective signal of the low-level user equipment is weakened, and an interference cancellation or suppression capability of the low-level user equipment needs to be improved to increase an SINR of the low-level user equipment and maintain performance of the low-level user equipment.

Figure 4:
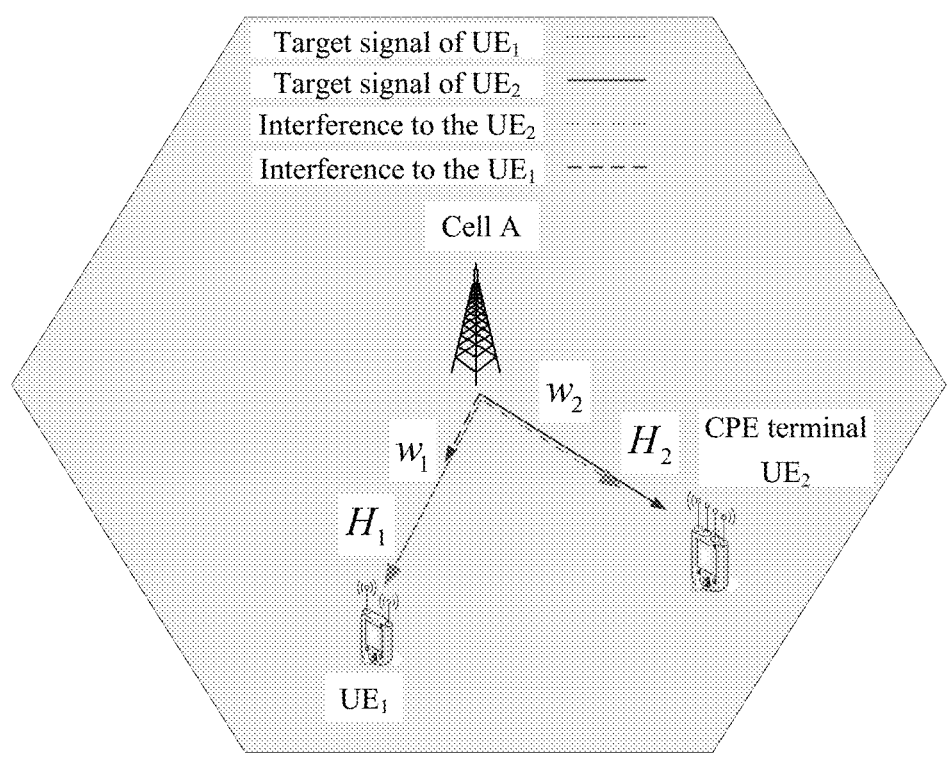
FIG. 4 is a schematic diagram of an MU solution in a hybrid user equipment pairing scenario according to an embodiment of the present invention.

FIG. 4 is a schematic diagram of an MU solution in a hybrid user equipment pairing scenario. An implementation solution 1 is described based on this scenario in which, for example, an FDD system is used, a quantity of transmit antennas on a base station side is 4, and quantities of receive antennas of user equipments are 2 and 4, respectively. It is assumed that a serving cell implements pairing of first layer user equipment according to a commonly used proportion fairness principle. To improve spectral efficiency of the system, in addition to the first layer user equipment, new user equipment is expected to be paired, to implement MU-MIMO transmission. During pairing, user equipments of a same type or user equipments of different types may be paired. In the hybrid user equipment pairing scenario, a core idea of design is to ensure performance of a weak-capability terminal, and maintain performance of a strong-receiver-capability terminal by using a capability of the strong-receiver-capability terminal.

Figure 5A:
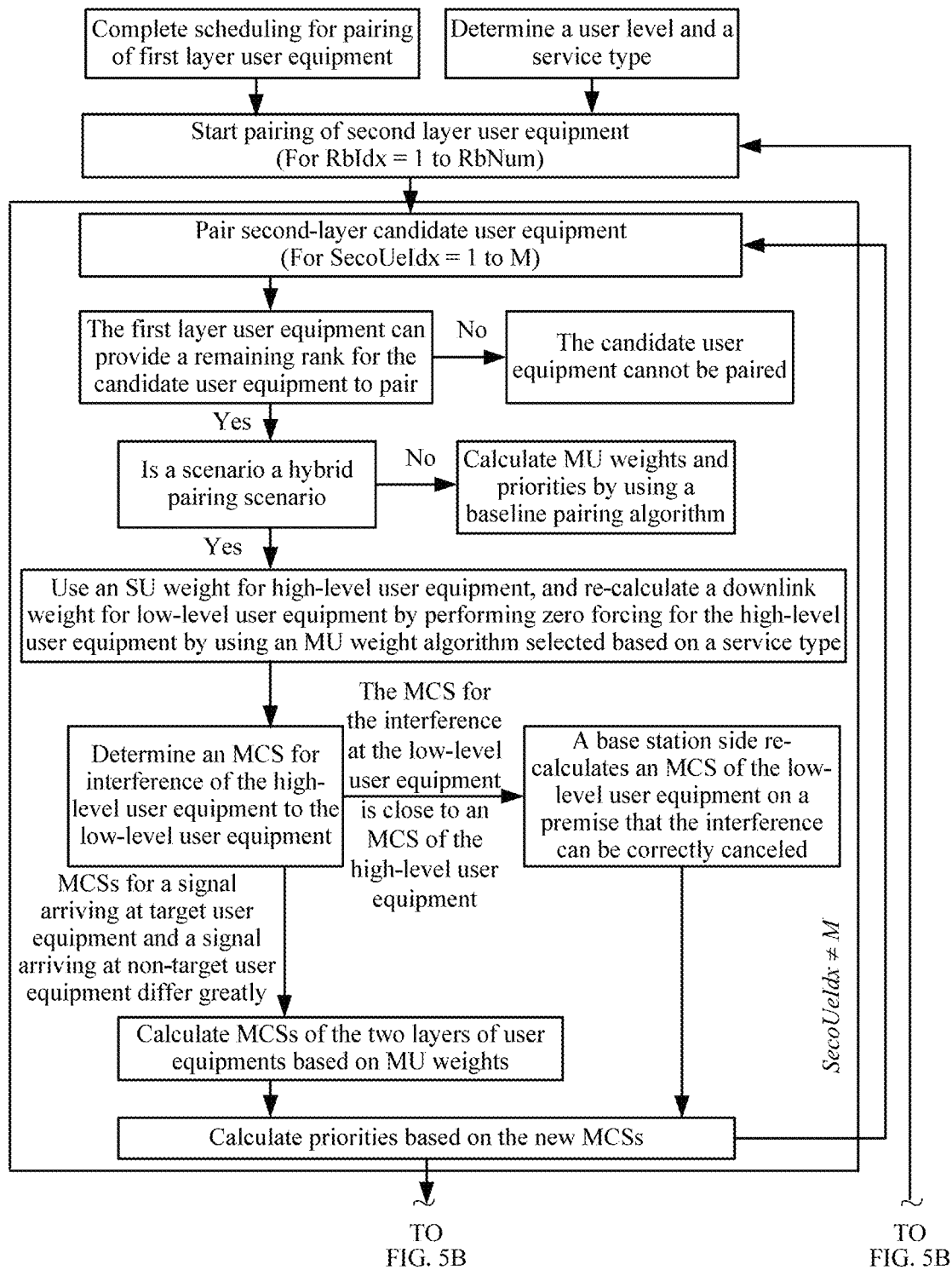
FIG. 5A and FIG. 5B are an overall flowchart of downlink transmission on a base station side in a case of unidirectional zero forcing according to an embodiment of the present invention.
Figure 5B:
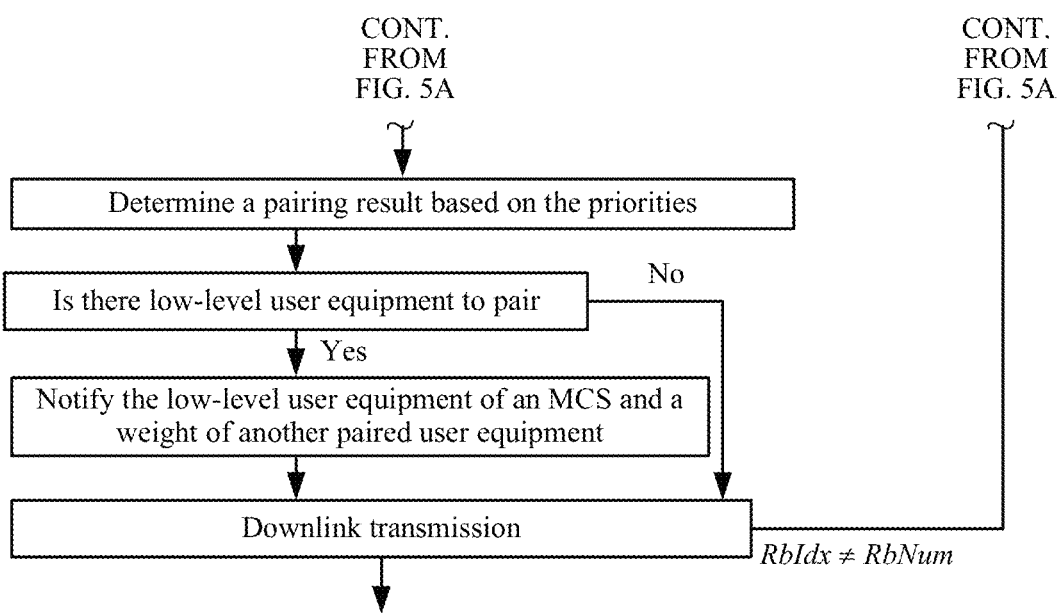

FIG. 5A and FIG. 5B are an overall flowchart of downlink transmission on a base station side in a case of unidirectional zero forcing. As shown in FIG. 5A and FIG. 5B, an overall process on the base station side includes the following operations:

(1) A base station sets user levels for user equipments based on receiver capabilities of the user equipments. Weak-receiver-capability user equipment is at a high level, and strong-receiver-capability user equipment is at a low level. In addition, the base station selects, based on service types of paired user equipments, a corresponding weight algorithm for a unidirectional zero forcing process.

(2) In an MU scheduling process, when user equipments at a same level are paired on a same RB resource, use an existing MU weight design solution, that is, a solution in which paired user equipments have an equal status; and then calculate priorities after pairing.

(3) When user equipments at different levels are paired on a same RB resource, use an SU weight for high-level user equipment based on a signal maximization principle, and adjust a weight of low-level user equipment by using a corresponding zero forcing algorithm (EZF, REZF, SLNR, or the like), to reduce interference to the high-level user equipment. Re-estimate an MCS, of the high-level user equipment.

(4) The base station side calculates, based on a receiver type of the low-level user equipment, an $MCS_2$ of a high-level user equipment signal to an interference path of the low-level user equipment. If it is determined that $MCS_2 \geq MCS_1$, it is considered that the low-level user equipment has a capability of correctly decoding interference, and an MCS of the low-level user equipment is re-estimated on a premise that the interference is completely canceled. If the foregoing condition is not met, an MCS of the user equipment is calculated directly based on an adjusted weight in operation (4).

(5) Return to the general MU scheduling process, calculate priorities based on the MCSs of all the user equipments in an MU pairing mode, and perform pairing based on the priorities.

(6) If hybrid pairing is performed, the base station notifies the low-level user equipment of PMIs and MCS index values of all code words sent by the another paired user equipment, to implement downlink transmission.

Figure 6:
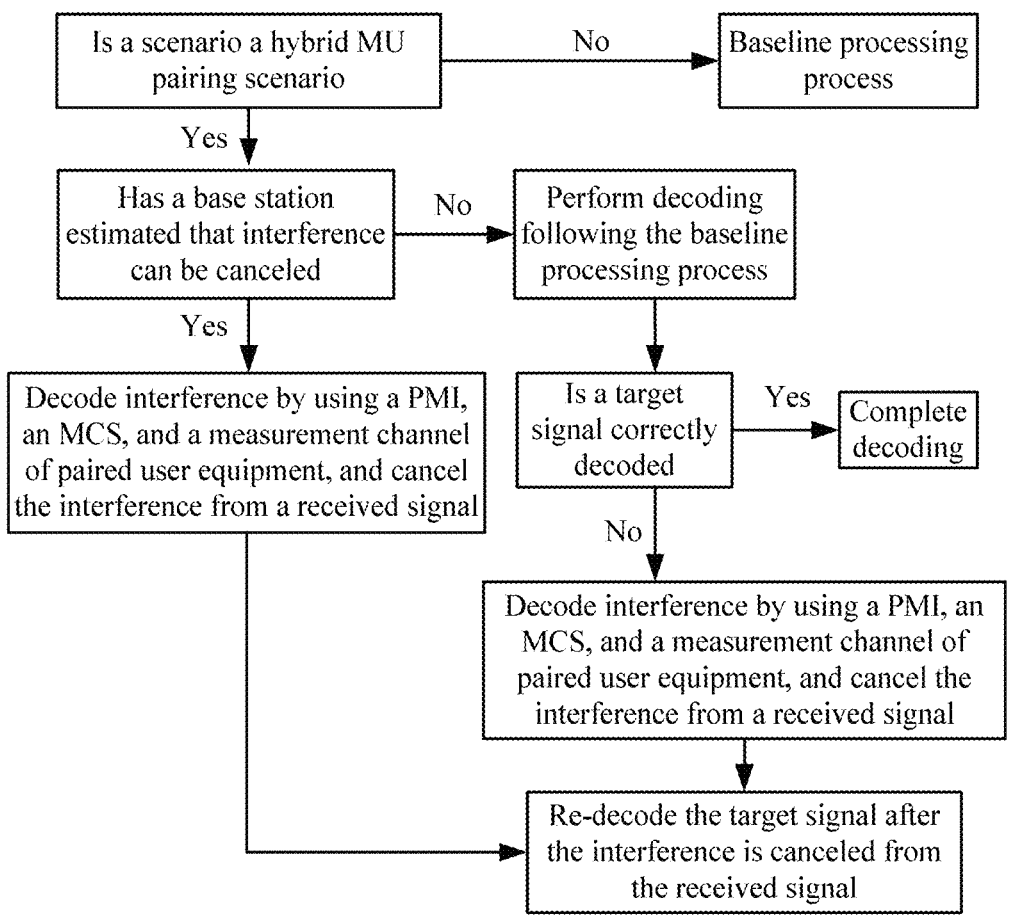
FIG. 6 is a flowchart of receiving processing on a low-level user equipment side according to an embodiment of the present invention.

FIG. 6 is a flowchart of receiving processing on a low-level user equipment side. On a user side, a main improvement is made on a processing process of low-level user equipment in a hybrid pairing scenario. As shown in FIG. 6, when the low-level user equipment is paired with user equipment of a same type, a conventional MU processing process is used. If hybrid pairing is performed and the low-level user equipment is notified that interference needs to be decoded and canceled, the low-level user equipment demodulates and decodes an interference signal of a paired user based on a PMI, an MCS, and a measurement channel of another paired user equipment; performs interference cancellation by using the decoded interference signal; and decodes an effective signal after interference cancellation. If the low-level user equipment is not notified that interference needs to be decoded, the low-level user equipment attempts to decode and cancel interference only when an error occurs during normal decoding of a target signal, and attempts to decode the target signal again.

According to design of the present invention, in the hybrid user equipment pairing scenario, two types of interaction information need to be added between a base station and the low-level user equipment. Firstly, the base station sends a downlink PMI and an MCS of another paired user equipment to the low-level user equipment. Secondly, the base station notifies the low-level user equipment whether an MCS for downlink transmission is designed for the low-level user equipment based on an estimation that interference of the another paired user equipment can be canceled.

The following describes a specific implementation process of the solution.

1. Determining a User Equipment Level

User equipment levels are determined mainly to distinguish between interference suppression capabilities of user equipments by a quantity of receive antennas of the user equipments. However, in an actual system, user equipment does not report a quantity of antennas. According to a description of the protocol 36.331, user equipment reports only a maximum quantity of ranks (Rank) supported by the user equipment in a selected downlink transmission mode. A maximum rank capability can also represent a receiver capability of user equipment in a specific sense. In this embodiment of the present invention, a user equipment level may be set based on a rank capability reported by user equipment. User equipment whose maximum quantity of supported ranks is small is at a high level, and user equipment whose maximum quantity of supported ranks is large is at a low level. Setting of the user equipment level is relatively flexible. A user equipment level may be a relative level or an absolute level. For example, a threshold may be specified. A quantity of ranks supported by low-level user equipment is greater than the threshold, and a quantity of ranks supported by high-level user equipment is less than or equal to the threshold.

2. Selecting an MU Weight Algorithm Based on a Service Type

In the hybrid pairing scenario, an MU weight of low-level user equipment needs to be adjusted, and an MU weight algorithm should be selected based on a specific service type. If the low-level user equipment carries a mobile broadband (Mobile Broad band, MBB) service, it is not recommended that an EZF solution be used in which zero forcing may be performed excessively and consequently a rate perceived by the low-level user equipment decreases excessively.

Three zero forcing algorithms are mainly used currently: EZF, REZF, and SLNR. EZF has a best zero forcing effect, but a serious signal loss usually occurs on user equipment. The latter two algorithms are relatively moderate, and can keep a balance between full zero forcing and quality of a target signal of user equipment.

A zero forcing solution proposed in this solution may be shown in Table 1.

TABLE 1

| Low-level user equipment service | MU weight solution |
|---|---|
| Existence of a small packet service | REZF or SLNR algorithm |
| Large packet service | EZF algorithm |

It can be learned from Table 1 that, in this embodiment of the present invention, the MU weight solution needs to be selected based on a service carried by low-level user equipment. If the service carried by the low-level user equipment includes a small packet service requiring relatively high channel quality, a relatively moderate linear zero forcing solution needs to be used as the weight solution.

3. MU Weight of High-Level User Equipment in the Hybrid User Equipment Pairing Scenario A model of a signal received by high-level user equipment in an MU pairing mode is as follows:

$$y_1 + H_1 w_1 x_1 + H_1 w_2 x_2 + n_1,$$

where $H_1$ is a channel from a base station to user equipment 1, $w_1$ is a beamforming vector used when the base station sends a signal to the user equipment 1, $w_2$ is a beamforming vector used when the base station sends a signal to user equipment 2, $x_1$ is a baseband signal sent by the base station to the user equipment 1, $x_2$ is a baseband signal sent by the base station to the user equipment 2, $n_1$ is a noise floor of the user equipment 1, and $y_1$ is a signal received by the user equipment 1.

An SINR before the user equipment performs equalization is as follows:

$$SINR_1 = \frac{\|H_1 w_1\|_F^2}{\|H_1 w_2\|_F^2 + \sigma^2},$$

where $H_1$ is the channel from the base station to the user equipment 1, $w_1$ is the beamforming vector used when the base station sends a signal to the user equipment 1, $w_2$ is the beamforming vector used when the base station sends a signal to the user equipment 2, and $\sigma^2$ is a noise power of the user equipment 1.

It can be learned from the SINR formula of the high-level user equipment that there are two main approaches to improve performance of the user equipment: (1) increasing a strength of a target signal arriving at the user equipment; and (2) reducing signal interference of another paired user equipment.

From a perspective of increasing the target signal strength, weight design for the high-level user equipment needs to meet the following condition:

$$w_1 = \underset{w}{\operatorname{argmax}} \|H_1 w\|_F^2 \Leftrightarrow w_1 = \underset{w}{\operatorname{argmax}} w^H (H_1^H H_1) w,$$

where $H_1$ is the channel from the base station to the user 1, w is candidate weight vectors of the user equipment 1, and $w_1$ is optimum beamforming vectors used when the base station sends a signal to the user equipment 1.

Currently, when a terminal reports an SU weight, a calculation process of a PMI reported by the user equipment completely complies with the foregoing requirement.

Using one rank and an R8 codebook (a current quantity of antennas of high-level user equipment is 2, and second layer user equipment can be configured only when one rank is used for first layer pairing) as an example, a precoding codebook is $W_1 = \{w_0, w_1, \ldots, w_{15}\}$. A PMI is selected based on a maximum correlation principle.

A sub-band PMI calculation formula is as follows:

$$w^{opt} = \underset{w \in W_1}{\operatorname{argmax}} w^H \left( \frac{1}{N_{RB}^{sb}} \cdot \sum_{i=n_{RB}^{Begin}}^{n_{RB}^{End}} R_i \right) w,$$

where Ri is a channel correlation matrix of the user equipment on each RB, $N_{RB}^{sb}$ is a quantity of RBs on each sub-band, and w is candidate weight vectors of the user equipment.

A full-band PMI calculation formula is as follows:

$$w^{opt} = \underset{w \in W_1}{\operatorname{argmax}} w^H \left( \frac{1}{N_{RB}^{DL}} \cdot \sum_{i=1}^{N_{RB}^{DL}} R_i \right) w,$$

where Ri is the channel correlation matrix of the user equipment on each RB, $N_{RB}^{DL}$ is a quantity of RBs on a full-band, and w is the candidate weight vectors of the user equipment.

Therefore, when hybrid pairing is performed, the high-level user equipment should directly use a weight reported in an SU mode. In addition, when hybrid pairing is performed for user equipments at more than two layers, if there is only one high-level user equipment in the paired user equipments, a weight reported by in the SU mode is directly used; otherwise, linear zero forcing is performed on all paired high-level user equipments to design MU weights. For a weight solution, refer to SLNR, REZF, or the like. When a power is evenly allocated, a power of high-level user equipment is half that in the SU mode.

After high-level user equipment is paired, an MCS needs to be adjusted, and the following factors need to be considered:

(1) The high-level user equipment cannot report a receiver type because of protocol limitation.

(2) Low-level user equipment paired with the high-level user equipment uses a weight obtained through unidirectional zero forcing, expecting to cancel interference of a signal of the low-level user equipment to the high-level user equipment.

(3) The low-level user equipment uses a PMI-quantized channel in zero forcing. An error usually exists in weight design, and the interference is not completely canceled. In addition, residual interference varies depending on a weight solution. For example, REZF or SLNR allows residual interference in a design process.

(4) If the high-level user equipment uses an IRC receiver, when one rank is used, the high-level user equipment has another dimension of interference suppression capability to suppress residual interference of the paired user equipment. The IRC receiver is expected to have a relatively good suppression effect.

Based on the foregoing factors, an SINR reported by the user equipment to the base station should first be reduced by 3 dB (the power is reduced by half), and then an empirical value ExpAdj is designed to further reduce an expected SINR appropriately, where ExpAdj may be 0. The design may be specifically adjusted during implementation.

$$SINR_{MU} = SINR_{SU} - 3 \text{ dB} - \text{ExpAdj}$$

4. MU Weight Algorithm of Low-Level User Equipment

As described above, three zero forcing algorithms are mainly used currently: EZF, REZF, and SLNR. EZF has the best zero forcing effect, but the serious signal loss usually occurs on user equipment. The latter two algorithms are relatively moderate, and can keep a balance between full zero forcing and quality of a target signal of user equipment. Herein, implementation of the three algorithms is mainly described.

(1) EZF Algorithm

A principle of the eigenvector zero forcing (EZF) algorithm is as follows: For user equipments $a_1, \ldots, a_N \in S_m$ in a cell, a signal sent by each user equipment is made orthogonal to a channel characteristic direction of another user equipment in the set $S_m$. This algorithm actually uses an eigenvector of user equipment to reconstruct a channel from a base station to the user equipment.

A PMI from the serving cell to paired user equipment can be obtained by measuring a cell-specific reference signal (CRS) or a channel state information process (CSI-Process), and an eigenvector corresponding to the PMI is used to reconstruct a downlink channel to calculate an MU weight. Assuming that an input parameter is eigenvectors $\{V_1(k), V_2(k), \ldots, V_n(k)\}$ of users, an EZF joint channel matrix is constructed as follows:

$$H(k) = \begin{bmatrix} V_1(k)^H \\ V_2(k)^H \\ \ldots \\ V_n(k)^H \end{bmatrix}$$

When MU weights of low-level user equipments in the hybrid pairing scenario need to be calculated, first m rows of H(k) include SU weight vectors of the low-level user equipments, and last n-m rows include SU weight vectors of high-level user equipments. A quantity of dimensions of $V_i(k)$ is T*1, and T is a quantity of transmit antennas of the base station. A weight calculation formula of the low-level user equipments in the hybrid pairing scenario is as follows:

$$W = H(k)^H (H(k)H(k)^H)^{-1} \operatorname{diag}(\beta)$$

First m columns of W are the MU weights of the low-level user equipments, and β is a column normalization factor.

When zero forcing needs to be performed between the plurality of high-level user equipments, H(k) includes only the SU weights of the high-level user equipments, and weights in columns calculated according to a subsequent formula are MU weights corresponding to the high-level user equipments.

(2) REZF Algorithm

An MU weight calculation formula in unidirectional zero forcing is different from that in a single-cell baseline REZF solution. In single-cell baseline MU weight design, MU weights of two paired user equipments are jointly designed, and both the weights are adjusted. However, a case is different in unidirectional zero forcing design, that is, in the MU pairing mode, high-level user equipment still uses an SU weight, and only a weight of low-level user equipment is adjusted.

Figure 7:
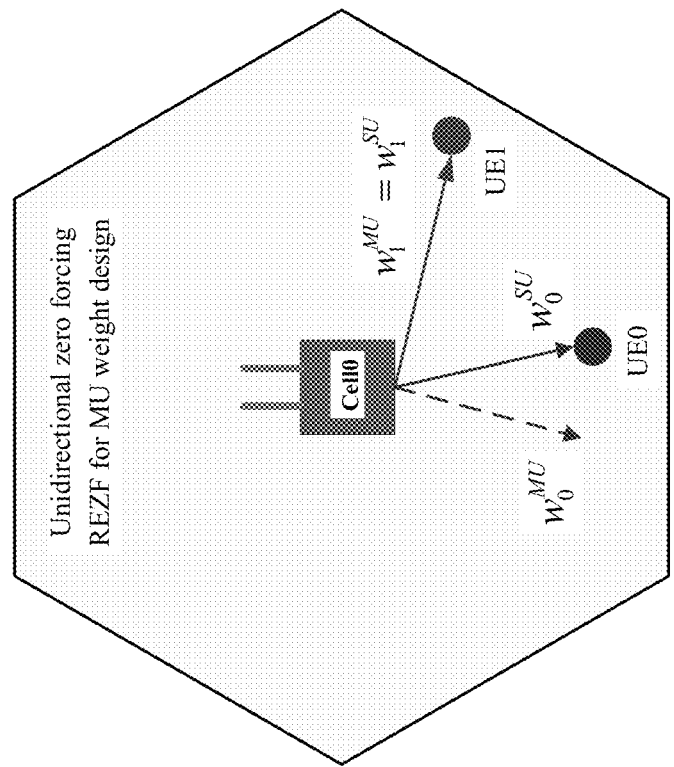
FIG. 7 is a schematic diagram of a difference between an existing MU weight and an MU weight in unidirectional zero forcing.
Figure 7:
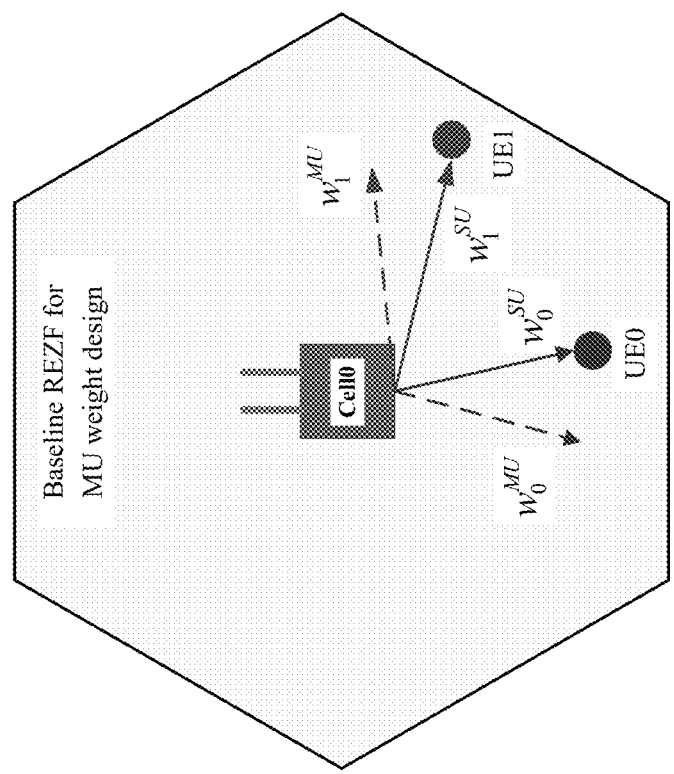

A difference is shown in FIG. 7: When MU weights of low-level user equipments in the hybrid user equipment pairing scenario need to be calculated, first m columns of $\{V_1(k), V_2(k), \ldots, V_n(k)\}$ are set to SU weight vectors of the low-level user equipments, and last n-m columns are set to SU weight vectors of high-level user equipments (having a weak receiver capability). An REZF joint channel matrix is constructed as follows:

$$H(k) = \begin{bmatrix} V_1(k)^H \\ V_2(k)^H \\ \ldots \\ V_n(k)^H \end{bmatrix}$$

An REZF weight calculation formula in unidirectional zero forcing is as follows:

$$W = H(k)^H (H(k)H(k)^H + \operatorname{diag}(\alpha))^{-1} \operatorname{diag}(\beta),$$

where $\alpha_i$ is an element disturbing a matrix diag (α), and $$\alpha_i = \frac{1}{SINR_i};$$

the MU weights finally used by the low-level user equipments are first m columns of a weight matrix W; $SINR_i$ represents an SINR reported by user equipment i in the SU mode; and an element $\beta_i$ in diag(β) is a column normalization factor.

In the existing MU weight design solution, weights of all paired user equipments need to be adjusted. In this case, $$\alpha_i = \frac{\sigma_i^2 L}{P_{R_i}} = \frac{L}{SINR_i}$$

in the REZF algorithm formula, where L is a total quantity of paired layers. This is an important difference between the REZF algorithm formula used in this embodiment of the present invention and the existing solution, and this difference is caused by unidirectional zero forcing.

In the REZF solution for MU weight design, a corresponding calculation formula is proposed based on an application requirement of unidirectional zero forcing, improving performance of the REZF algorithm in the unidirectional zero forcing solution.

When zero forcing needs to be performed between the plurality of high-level user equipments, H(k) includes only the SU weights of the high-level user equipments, and weights in columns calculated according to a subsequent formula are MU weights corresponding to the high-level user equipments.

(3) SLNR Algorithm

A principle of a signal-to-leakage-plus-noise ratio (SLNR) maximization algorithm is to maximize, for user equipment $\alpha_i \in S_m$ in a cell, a ratio of a signal received power of the user equipment to interference leaked by the user equipment to another paired user equipment plus a noise power. In other words, a weight generation constraint of the user equipment is to maximize the signal power relative to a power of a signal leaked to the another user equipment plus noise, so that a weight can mitigate interference leaked to the another user equipment and a signal-to-noise ratio problem of the target user equipment.

For the FDD system, in a case of pairing with one rank used, during weight calculation by using the SLNR algorithm, a weight corresponding to a PMI reported by a user i whose MU weight needs to be calculated is $w_i^{PMI}$, and a weight corresponding to a PMI reported by another user equipment that the user equipment needs to avoid interfering with is $w_j^{PMI}$. $N_R$ is a quantity of receive antennas of the low-level user equipment, and $SINR_i$ represents an SINR reported by the low-level user equipment in the SU mode. A weight calculation formula based on the SLNR principle may be further represented as follows:

$$VDV^{-1} = \left( \frac{N_R}{SINR_i} I_{t \times t} + \sum_{j \neq i} (w_j^{PMI})(w_j^{PMI})^H \right)^{-1} (w_i^{PMI})(w_i^{PMI})^H,$$

where V is a matrix including eigenvectors obtained after eigenvalues on the right of the equation are decomposed, D is a diagonal matrix including the eigenvalues, and I is a unit matrix.

A maximum eigenvector is to be calculated according to the foregoing formula, and the maximum eigenvector is the MU weight of the user equipment.

5. MCS Estimation on the Base Station Side for an Interference Signal Received by Low-Level User Equipment When the base station side estimates an MCS of an interference signal j received by low-level user equipment i, the following three factors need to be considered: Firstly, for a channel H from the base station to the user equipment, $H_i \sim (w_i^{SU})^H$ can be replaced only with an SU weight $w_i^{SU}$ corresponding to a PMI reported by the low-level user equipment, but precision is limited. Secondly, when decoding interference, the low-level user equipment processes an effective signal of the low-level user equipment as interference, and the base station needs to learn of a receiver solution of the low-level user equipment. Thirdly, a noise floor is estimated by using a reported SINR, and a transmit power is evenly allocated in the MU pairing transmission mode.

Based on the foregoing situation, calculation is performed by using an MRC receiver or an IRC receiver.

(1) MRC Receiver $$SINR_i^{Interference,j} = \frac{\frac{1}{N}\|(w_i^{SU})^H w_j^{MU}\|^2}{\sum_{k=1,k\neq j}^{N}\|((w_i^{SU})^H w_k^{MU})^H (w_i^{SU})^H w_j^{MU}\|^2 + \sigma^2}$$

$$= \frac{\frac{1}{N}\|(w_i^{SU})^H w_j^{MU}\|^2}{\sum_{k=1,k\neq j}^{N}\|((w_i^{SU})^H w_k^{MU})^H (w_i^{SU})^H w_j^{MU}\|^2 + \frac{1}{SINR_i^{SU}}},$$

where N represents a total quantity of paired user equipments.

(2) IRC Receiver (Information is Limited, and it can Only be Assumed that the Low-Level User Equipment has a Strong Interference Suppression Capability, and that No Interference is Left in a Target Signal)

$$SINR_i^{Interference,j} = \frac{\frac{1}{N}\|(w_i^{SU})^H w_j^{MU}\|^2 P}{\sigma^2} = \frac{1}{N}\|(w_i^{SU})^H w_j^{MU}\|^2 SINR_i^{SU}$$

A mapped-to MCS value is obtained through table lookup based on an obtained $SINR_i^{Interference,j}$.

6. MCS Estimation on the Base Station Side for Low-Level User Equipment (1) An MCS of a Target Signal Obtained after Interference Cancellation If the base station side determines that the low-level user equipment i can successfully decode and cancel interference from a user equipment set K[k1, k2 . . . ], it can be assumed during MCS adjustment for the target signal that the interference from these user equipments has been completely canceled.

When the MRC receiver is used, $$SINR_i^{Target} = \frac{\frac{1}{N}\|(w_i^{SU})^H w_i^{MU}\|^2}{\sum_{j=1,j\neq i,j\notin K[k_1,k_2\ldots]}^{N}\|((w_i^{SU})^H w_j^{MU})^H (w_i^{SU})^H w_i^{MU}\|^2 + \frac{1}{SINR_i^{SU}}}.$$

A corresponding MCS value is obtained through table lookup based on an obtained $SINR_i^{Target}$.

When the IRC receiver is used (information is limited, and it can only be assumed that the low-level user equipment has a strong interference suppression capability, and that no interference is left in a target signal):

$$SINR_i^{Target} = \frac{\frac{1}{N}\|(w_i^{SU})^H w_i^{MU}\|^2 P}{\sigma^2} = \frac{1}{N}\|(w_i^{SU})^H w_i^{MU}\|^2 SINR_i^{SU},$$

where N represents a total quantity of paired user equipments.

(2) An MCS of a Target Signal Obtained without Interference Cancellation

When the base station side cannot determine whether the low-level user equipment can successfully cancel interference, the following factors need to be considered during MCS adjustment for the target signal: Firstly, an MU weight of another paired high-level user equipment is not jointly designed with a weight of the low-level user equipment, and interference to the target signal exists. Secondly, the base station side can learn of a type of a receiver used by the low-level user equipment, but cannot obtain complete channel information, and therefore the base station side cannot reproduce an IRC process on the low-level user equipment side. If the low-level user equipment uses the IRC receiver, it can only be assumed that the low-level user equipment has a relatively strong interference cancellation (IC) capability, and that interference is canceled. Thirdly, for a channel H from the base station to the user equipment, $H_i \sim (w_i^{SU})^H$ can be replaced only with an SU weight corresponding to a PMI reported by the low-level user equipment, but precision is limited. Fourthly, a power is evenly allocated to paired user equipments.

When the MRC receiver is used:

$$SINR_i^{Target} = \frac{\frac{1}{N}\|(w_i^{SU})^H w_i^{MU}\|^2}{\sum_{j=1,j\neq i}^{N}\|((w_i^{SU})^H w_j^{MU})^H (w_i^{SU})^H w_i^{MU}\|^2 + \sigma^2}$$

$$= \frac{\frac{1}{N}\|(w_i^{SU})^H w_i^{MU}\|^2}{\sum_{j=1,j\neq i}^{N}\|((w_i^{SU})^H w_j^{MU})^H (w_i^{SU})^H w_i^{MU}\|^2 + \frac{1}{SINR_i^{SU}}}$$

When the IRC receiver is used (information is limited, and it can only be assumed that the low-level user equipment has a strong suppression capability, and that no interference is left in a target signal):

$$SINR_i^{Target} = \frac{\frac{1}{N}\|(w_i^{SU})^H w_i^{MU}\|^2 P}{\sigma^2} = \frac{1}{N}\|(w_i^{SU})^H w_i^{MU}\|^2 SINR_i^{SU}$$

7. Interference Cancellation by Low-Level User Equipment

Figure 8:
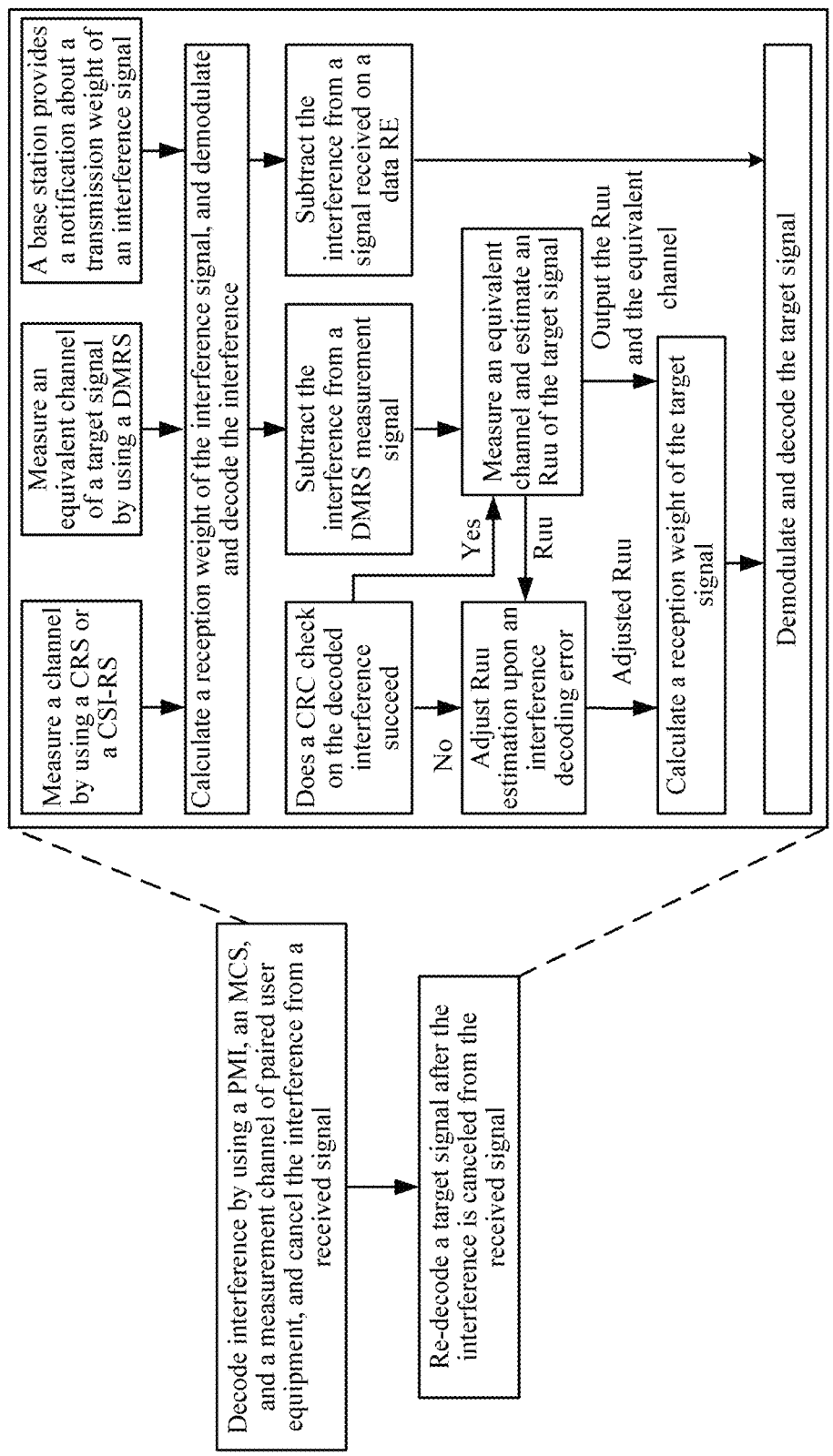
FIG. 8 is a schematic flowchart of interference cancellation by low-level user equipment according to an embodiment of the present invention.

In the hybrid pairing scenario, to improve performance of decoding a target signal, the low-level user equipment side needs to cancel interference from signal noise of ordinary user equipment. A processing process is shown in FIG. 8.

Processing operations are similar to those in an uplink interference cancellation (IC) processing process, and the specific processing process is as follows:

(1) Low-level user equipment performs measurement by using a CRS or a CSI-RS, to obtain a channel $H_{Low}$ from the base station side to the low-level user equipment; performs measurement by using a demodulation reference signal (DMRS) to obtain an equivalent channel $\overline{H}_{Low}{}^{Target}=Hw_{Low}{}^{Target}$ of a target signal; obtains a downlink transmission weight $w_{Low}{}^{Interference}$ of another paired user equipment by using a private interaction solution of the base station; and calculates a reception weight of an interference signal, and demodulates and decodes the interference signal.

(2) Input decoded interference to a DMRS measurement module, subtract a reconstructed interference signal $\overline{s}_{High}$ from a DMRS-received signal $r_{DMRS}$, perform DMRS-based measurement to obtain a new equivalent channel $\overline{H}_{Low,second}{}^{Target}$ of the target signal, and estimate a new Ruu $Ruu_{Low}{}^{IC}$.

$$\overline{r}_{DMRS}=r_{DMRS}-\overline{H}_{Low}w_{Low}{}^{Interference}\overline{s}_{High}$$

(3) Re-calculate a reception weight of the target signal by using the new equivalent channel and Ruu. Before the reception weight of the target signal is calculated, processing of the Ruu includes two cases.

Case 1: If a CRC check on the decoded interference signal succeeds, the Ruu obtained after IC is no longer adjusted.

$$Ruu_{Low,second}{}^{Target}=Ruu_{Low}{}^{IC}$$

Case 2: If a CRC check on the decoded interference signal fails, the following adjustment needs to be performed:

$$Ruu_{Low,second}{}^{Target}=Ruu_{Low}{}^{IC}+\sigma_{IC}^{2}*E[(\overline{H}_{Low}{}^{Interference})(\overline{H}_{Low}{}^{Interference})^{H}]$$

$\sigma_{IC}^{2}$ is a frequency-domain covariance of the reconstructed interference signal, and $E[(\overline{H}_{Low}{}^{Interference})(\overline{H}_{Low}{}^{Interference})^{H}]$ represents a correlation matrix average value of an equivalent channel of the interference signal. An Ruu is usually calculated based on an RB or RBG level, and a corresponding $E[(\overline{H}_{Low}{}^{Interference})(\overline{H}_{Low}{}^{Interference})^{H}]$ represents a correlation matrix average value of an equivalent channel of an interference signal on the RB or the RBG (4) Input the decoded interference to an effective signal measurement module, and subtract the reconstructed interference signal $\overline{s}_{High}$ from a received data signal $r_{Target}$.

$$\overline{r}_{Target}=r_{Target}-\overline{H}_{Low}w_{Low}{}^{Interference}\overline{s}_{High}$$

(5) Demodulate and decode the target signal based on a data signal obtained after IC and the new reception weight of the target signal.

In this embodiment of the present invention, in the hybrid user equipment pairing scenario, the unidirectional zero forcing solution is used to ensure performance of weak-receiver-capability user equipment and exploit interference suppression potential of strong-receiver-capability user equipment. The high-level user equipment does not perform zero forcing, and still uses an optimum downlink weight, to ensuresignal quality of the high-level user equipment with a relatively weak receiver capability. The low-level user equipment uses a weight obtained through unidirectional zero forcing, to reduce interference to the high-level user equipment and further ensurechannel quality of the high-level user equipment, and the low-level user equipment can still maintain relatively good performance with its strong receiver capability. Based on division of the user equipment levels and targeted MU weight design, the weak-receiver-capability user equipment is ensured, and performance of the strong-receiver-capability user equipment is exerted.

The foregoing mainly describes the solutions in the embodiments of the present invention from a perspective of interaction between the network elements. It can be understood that, to implement the foregoing functions, the network elements, for example, the base station and the user equipment, include corresponding hardware structures and/or software modules for performing the functions. A person of ordinary skill in the art should easily be aware that, units and algorithm operations in examples described with reference to the embodiments disclosed in this specification may be implemented by hardware or a combination of hardware and computer software. Whether a function is implemented by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, the base station, the user equipment, and the like may be divided into function modules based on the foregoing method examples. For example, function modules corresponding to various functions may be obtained through division, or two or more functions may be integrated into one processing module. The integrated module may be implemented in a form of hardware, or may be implemented in a form of a software function module. It should be noted that the module division in the embodiments of the present invention is an example, is merely logical function division, and may be other division in actual implementation.

Figure 9:
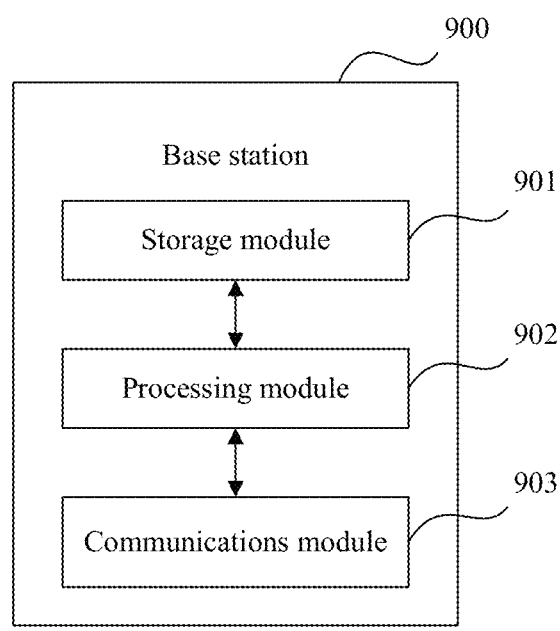
FIG. 9 is a structural diagram of a base station according to an embodiment of the present invention.

When the integrated module is used, FIG. 9 is a possible schematic structural diagram of the base station in the foregoing embodiments. The base station 900 includes a processing module 902 and a communications module 903. The processing module 902 is configured to perform control management on actions of the base station. For example, the processing module 902 is configured to support the base station in performing the processes 301 and 302 in FIG. 3A, the processes 311 and 312 in FIG. 3B, the processes 321, 322, and 323 in FIG. 3C, and/or another process of the technology described in this specification. The communications module 903 is configured to support communication between the base station and another network element, for example, communication between the base station and user equipment. The base station may further include a storage module 901, configured to store program code and data of the base station.

The processing module 902 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The processing module may implement or execute various example logical blocks, modules, and circuits described with reference to content disclosed in the present invention. Alternatively, the processing module may be a combination implementing a computing function, for example, a combination including one or more microprocessors, or a combination of a DSP and a microprocessor. The communications module 903 may be a communications interface, a transceiver, a transceiver circuit, or the like. The communications interface is a collective term and may include one or more interfaces. The storage module 901 may be a memory.

Figure 10:
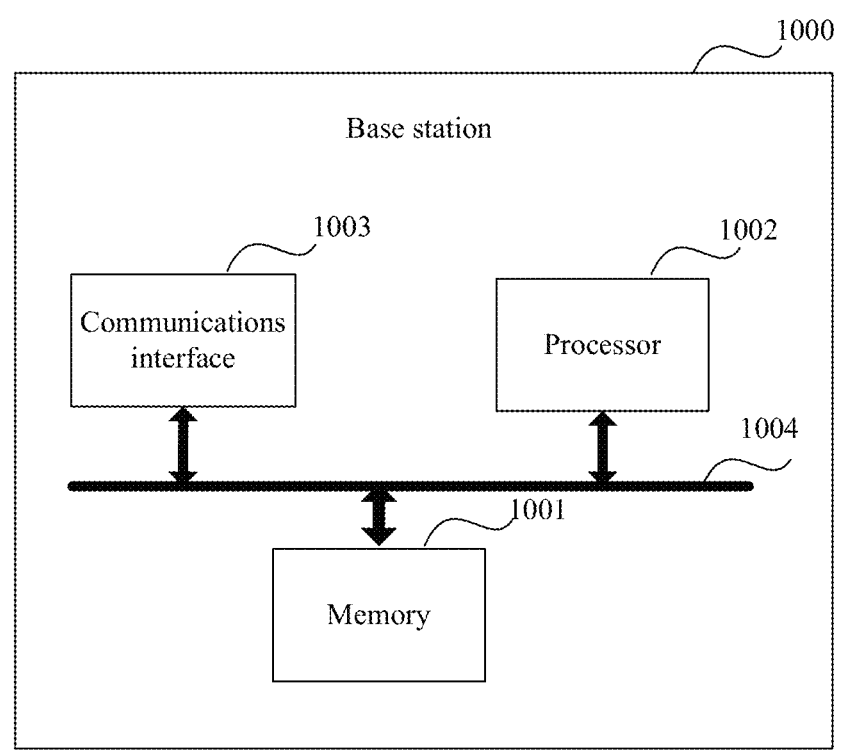
FIG. 10 is a structural diagram of another base station according to an embodiment of the present invention.

When the processing module 902 is a processor, the communications module 903 is a communications interface, and the storage module 901 is a memory, the base station in this embodiment of the present invention may be a base station shown in FIG. 10.

As shown in FIG. 10, the base station 1000 includes a processor 1002, a communications interface 1003, and a memory 1001. In one embodiment, the base station 1000 may further include a bus 1004. The communications interface 1003, the processor 1002, and the memory 1001 may be connected to each other by using the bus 1004. The bus 1004 may be a Peripheral Component Interconnect (PCI) bus, an extended industry standard architecture (EISA) bus, or the like. The bus 1004 may be classified into an address bus, a data bus, a control bus, and the like. For ease of representation, only one thick line is used to represent the bus in FIG. 10, but this does not mean that there is only one bus or only one type of bus.

Figure 11:
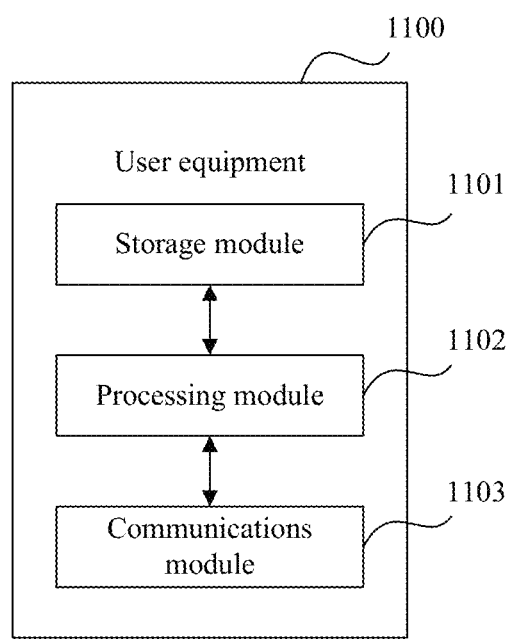
FIG. 11 is a structural diagram of user equipment according to an embodiment of the present invention.

When the integrated module is used, FIG. 11 is a possible schematic structural diagram of the user equipment in the foregoing embodiments. The user equipment 1100 includes a processing module 1102 and a communications module 1103. The processing module 1102 is configured to perform control management on actions of the user equipment. For example, the processing module 1102 is configured to support the user equipment in performing the processes 313 and 314 in FIG. 3B, the processes 324 and 325 in FIG. 3C, and/or another process of the technology described in this specification. The communications module 1103 is configured to support communication between the user equipment and another network element, for example, communication between the user equipment and a base station. The user equipment may further include a storage module 1101, configured to store program code and data of the user equipment.

The processing module 1102 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The processing module may implement or execute various example logical blocks, modules, and circuits described with reference to content disclosed in the present invention. Alternatively, the processing module may be a combination implementing a computing function, for example, a combination including one or more microprocessors, or a combination of a DSP and a microprocessor. The communications module 1103 may be a communications interface, a transceiver, a transceiver circuit, or the like. The communications interface is a collective term and may include one or more interfaces. The storage module 1101 may be a memory.

Figure 12:
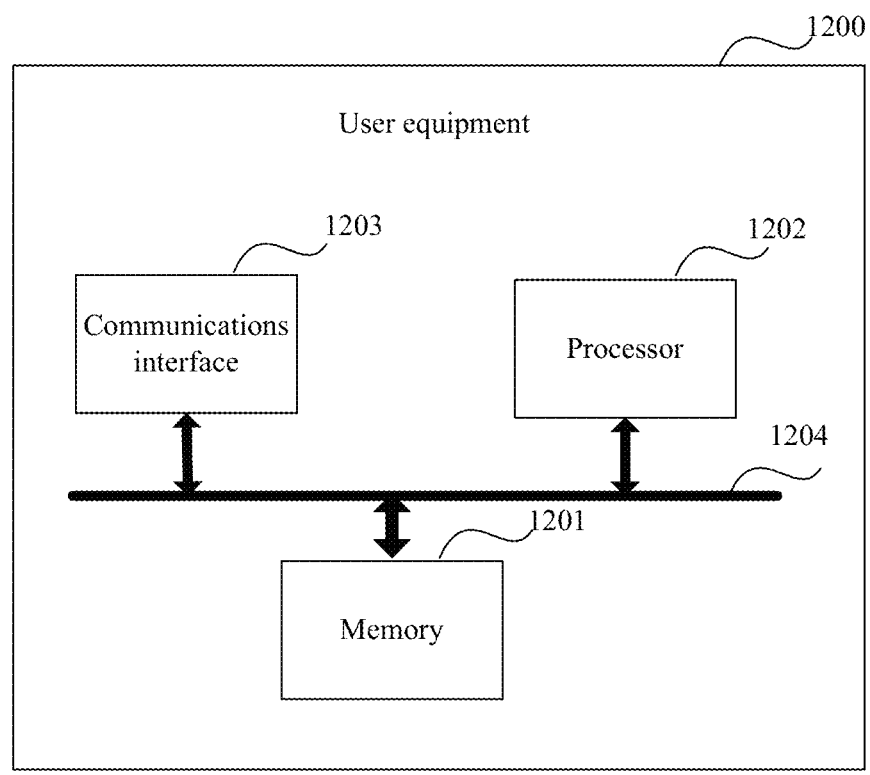
FIG. 12 is a structural diagram of another user equipment according to an embodiment of the present invention.

When the processing module 1102 is a processor, the communications module 1103 is a communications interface, and the storage module 1101 is a memory, the user equipment in this embodiment of the present invention may be user equipment shown in FIG. 12.

As shown in FIG. 12, the user equipment 1200 includes a processor 1202, a communications interface 1203, and a memory 1201. In one embodiment, the user equipment 1200 may further include a bus 1204. The communications interface 1203, the processor 1202, and the memory 1201 may be connected to each other by using the bus 1204. The bus 1204 may be a Peripheral Component Interconnect (PCI) bus, an extended industry standard architecture (EISA) bus, or the like. The bus 1204 may be classified into an address bus, a data bus, a control bus, and the like. For ease of representation, only one thick line is used to represent the bus in FIG. 12, but this does not mean that there is only one bus or only one type of bus.

Methods or algorithm operations described with reference to the content disclosed in the present invention may be implemented by hardware, or may be implemented by a processor by executing a software instruction. The software instruction may include a corresponding software module. The software module may be stored in a random access memory (Random Access Memory, RAM), a flash memory, a read only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A signal sending method, comprising:
  determining, by a base station, based on receiver capabilities of user equipments, that a first user equipment is to be paired with N second user equipments on a first resource block, wherein N is a positive integer, comprising:
    determining, by the base station, a multi-user (MU) weight of the first user equipment and MU weights of the N second user equipments based on a receiver capability of the first user equipment and receiver capabilities of the N second user equipments; and
    determining, by the base station based on the MU weight of the first user equipment and the MU weights of the N second user equipments, that the first user equipment is to be paired with the N second user equipments, including: sorting the first user equipment and the N second user equipments in ascending order of the receiver capabilities, wherein $1^{st}$ user equipment to $M^{th}$ user equipment are high-level user equipments, and $(M+1)^{th}$ user equipment to $(N+1)^{th}$ user equipment are low-level user equipments;

multiplexing, by the base station, a signal of the first user equipment and signals of the N second user equipments onto the first resource block; and
sending the signals.

2. The method according to claim 1, wherein the determining, by the base station, a MU weight of the first user equipment and MU weights of the N second user equipments based on a receiver capability of the first user equipment and receiver capabilities of the second user equipments comprises:
obtaining MU weights of the high-level user equipments by performing mutual zero forcing between the M high-level user equipments; and
obtaining MU weights of the low-level user equipments by performing mutual zero forcing between the first user equipment and the N second user equipments.

3. The method according to claim 2, wherein
the MU weights of the low-level user equipments are obtained by performing mutual zero forcing between the first user equipment and the N second user equipments by using an MU weight calculation method, wherein
the MU weight calculation method is determined based on service types of the low-level user equipments.

4. The method according to claim 1, wherein the determining, by the base station based on the MU weight of the first user equipment and the MU weights of the N second user equipments, that the first user equipment is to be paired with the N second user equipments comprises:
determining, by the base station, a modulation and coding scheme (MCS) of the first user equipment and MCSs of the N second user equipments based on the MU weight of the first user equipment and the MU weights of the N second user equipments; and
determining, by the base station based on the MCS of the first user equipment and the MCSs of the N second user equipments, that the first user equipment is to be paired with the N second user equipments.

5. The method according to claim 4, wherein the determining, by the base station, an MCS of the first user equipment and MCSs of the N second user equipments based on the MU weight of the first user equipment and the MU weights of the N second user equipments comprises:
for each low-level user equipment:
determining, by the base station, whether the low-level user equipment is capable of eliminating an interference signal of another user equipment from a received signal to obtain a determining result; and
determining, by the base station, an MCS of the low-level user equipment based on the determining result, the MU weight of the first user equipment, and the MU weights of the N second user equipments.

6. The method according to claim 1, wherein before the multiplexing, by the base station, a signal of the first user equipment and signals of the N second user equipments onto the first resource block, and sending the signals, the method further comprises:
sending, by the base station, a message to the first user equipment or at least one second user equipment, wherein the message comprises cancellation information of another user equipment, and the cancellation information comprises at least a modulation and coding scheme (MCS).

7. A base station, comprising:
a memory storing instructions; and
a processor coupled to the memory to execute the instructions to:
determine, based on receiver capabilities of user equipments, that a first user equipment is to be paired with N second user equipments on a first resource block, wherein N is a positive integer, comprising:
determining a multi-user (MU) weight of the first user equipment and MU weights of the N second user equipments based on a receiver capability of the first user equipment and receiver capabilities of the N second user equipments; and
determining, based on the MU weight of the first user equipment and the MU weights of the N second user equipments, that the first user equipment is to be paired with the N second user equipments, including:
sorting the first user equipment and the N second user equipments in ascending order of the receiver capabilities, wherein $1^{st}$ user equipment to $M^{th}$ user equipment are high-level user equipments, and $(M+1)^{th}$ user equipment to $(N+1)^{th}$ user equipment are low-level user equipments;
multiplex a signal of the first user equipment and signals of the N second user equipments onto the first resource block; and
send the signals.

8. The base station according to claim 7, wherein the processor executes the instructions to:
obtain MU weights of the high-level user equipments by performing mutual zero forcing between the M high-level user equipments; and
obtain MU weights of the low-level user equipments by performing mutual zero forcing between the first user equipment and the N second user equipments.

9. The base station according to claim 8, wherein the MU weights of the low-level user equipments are obtained by performing mutual zero forcing between the first user equipment and the N second user equipments by using an MU weight calculation method, and the MU weight calculation method is determined based on service types of the low-level user equipments.

10. The base station according to claim 7, wherein the processor executes the instructions to:
determine a modulation and coding scheme (MCS) of the first user equipment and MCSs of the N second user equipments based on the MU weight of the first user equipment and the MU weights of the N second user equipments; and
determine, based on the MCS of the first user equipment and the MCSs of the N second user equipments, that the first user equipment is to be paired with the N second user equipments.

11. The base station according to claim 10, wherein the processor executes the instructions to:
for each low-level user equipment:
determine whether the low-level user equipment is capable of eliminating an interference signal of another user equipment from a received signal to obtain a determining result; and
determine an MCS of the low-level user equipment based on the determining result, the MU weight of the first user equipment, and the MU weights of the N second user equipments.

12. The base station according to claim 7, wherein the processor executes the instructions to: before multiplexing the signal of the first user equipment and the signals of the N second user equipments onto the first resource block, and sending the signals, send a message to the first user equipment or at least one second user equipment, wherein the message comprises cancellation information of another user equipment, and the cancellation information comprises at least a modulation and coding scheme (MCS).

13. A non-transitory computer readable medium comprising computer program codes stored thereon, executable by one or more digital processors for sending signal, the computer program codes including:
    instructions for determining based on receiver capabilities of user equipments, that a first user equipment is to be paired with N second user equipments on a first resource block, wherein N is a positive integer, including instructions for:
        determining a multi-user (MU) weight of the first user equipment and MU weights of the N second user equipments based on a receiver capability of the first user equipment and receiver capabilities of the N second user equipments; and
        determining based on the MU weight of the first user equipment and the MU weights of the N second user equipments, that the first user equipment is to be paired with the N second user equipments, including:
            sorting the first user equipment and the N second user equipments in ascending order of the receiver capabilities, wherein $1^{st}$ user equipment to $M^{th}$ user equipment are high-level user equipments, and $(M+1)^{th}$ user equipment to $(N+1)^{th}$ user equipment are low-level user equipments; and
    instructions for multiplexing a signal of the first user equipment and signals of the N second user equipments onto the first resource block; and
    instructions for sending the signals.

14. The non-transitory computer readable medium according to claim 13, wherein the instructions for determining a MU weight of the first user equipment and MU weights of the N second user equipments based on a receiver capability of the first user equipment and receiver capabilities of the second user equipments comprise:
    instructions for obtaining MU weights of the high-level user equipments by performing mutual zero forcing between the M high-level user equipments; and
    instructions for obtaining MU weights of the low-level user equipments by performing mutual zero forcing between the first user equipment and the N second user equipments.

15. The non-transitory computer readable medium according to claim 14, wherein
    the MU weights of the low-level user equipments are obtained by performing mutual zero forcing between the first user equipment and the N second user equipments by using an MU weight calculation method, wherein
    the MU weight calculation method is determined based on service types of the low-level user equipments.

16. The non-transitory computer readable medium according to claim 13, wherein the instructions for determining a MU weight of the first user equipment and MU weights of the N second user equipments based on a receiver capability of the first user equipment and receiver capabilities of the second user equipments comprise:
    instructions for determining a modulation and coding scheme (MCS) of the first user equipment and MCSs of the N second user equipments based on the MU weight of the first user equipment and the MU weights of the N second user equipments; and
    instructions for determining based on the MCS of the first user equipment and the MCSs of the N second user equipments, that the first user equipment is to be paired with the N second user equipments.

17. The non-transitory computer readable medium according to claim 13, wherein the computer program codes include:
    instructions for sending a message to the first user equipment or at least one second user equipment, wherein the message comprises cancellation information of another user equipment, and the cancellation information comprises at least a modulation and coding scheme (MCS).

* * * * *